US011336458B2

(12) United States Patent
Mahaffey et al.

(10) Patent No.: US 11,336,458 B2
(45) Date of Patent: May 17, 2022

(54) EVALUATING AUTHENTICITY OF APPLICATIONS BASED ON ASSESSING USER DEVICE CONTEXT FOR INCREASED SECURITY

(71) Applicant: Lookout, Inc., San Francisco, CA (US)

(72) Inventors: Kevin Patrick Mahaffey, San Francisco, CA (US); Timothy Micheal Wyatt, Toronto (CA); Daniel Lee Evans, San Francisco, CA (US); Emil Barker Ong, Berkeley, CA (US); Timothy Strazzere, Oakland, CA (US); Matthew John Joseph LaMantia, San Francisco, CA (US); Brian James Buck, Livermore, CA (US)

(73) Assignee: Lookout, Inc., San Francisco, CA (US)

( * ) Notice: Subject to any disclaimer, the term of this patent is extended or adjusted under 35 U.S.C. 154(b) by 226 days.

(21) Appl. No.: 16/532,304

(22) Filed: Aug. 5, 2019

(65) Prior Publication Data
US 2019/0363893 A1 Nov. 28, 2019

Related U.S. Application Data

(63) Continuation of application No. 14/301,007, filed on Jun. 10, 2014, now Pat. No. 10,419,222, which is a (Continued)

(51) Int. Cl.
*G06F 11/00* (2006.01)
*G06F 12/14* (2006.01)
(Continued)

(52) U.S. Cl.
CPC .............. *H04L 9/3247* (2013.01); *G06F 8/60* (2013.01); *G06F 8/70* (2013.01); *G06F 11/3604* (2013.01);
(Continued)

(58) Field of Classification Search
CPC ....... H04L 9/3247; H04L 43/04; H04L 43/06; G06F 8/60; G06F 8/70; G06F 11/3604;
(Continued)

(56) References Cited

U.S. PATENT DOCUMENTS 3,416,032 A    12/1968   Jahns et al.
4,553,257 A    11/1985   Mori et al.
(Continued)

FOREIGN PATENT DOCUMENTS

EP    0965094    12/1999
EP    2765750    8/2014
(Continued)

OTHER PUBLICATIONS

Jan Spooren, Davy Preuveneers, and Wouter Joosen, "Mobile device fingerprinting considered harmful for risk-based authentication", In Proceedings of the Eighth European Workshop on System Security (EuroSec '15). ACM, New York, NY, USA, 2015.
(Continued)

*Primary Examiner* — Darshan I Dhruv
(74) *Attorney, Agent, or Firm* — Greenberg Traurig

(57) ABSTRACT

Software applications to be installed on user devices are monitored. Authenticity of the applications is evaluated using trust factors. In some cases, the trust factors relate to security associated with a network being accessed by a user device. In response to the evaluation, an action is performed such as configuring or disabling execution of one or more components of an application.

17 Claims, 9 Drawing Sheets

Related U.S. Application Data continuation of application No. 14/105,950, filed on Dec. 13, 2013, now Pat. No. 10,256,979.

(51) Int. Cl.

| | | |
|---|---|---|
| *G06F 12/16* | (2006.01) | |
| *G06F 21/57* | (2013.01) | |
| *G06F 8/60* | (2018.01) | |
| *G06F 11/36* | (2006.01) | |
| *G06F 8/70* | (2018.01) | |
| *G06F 21/44* | (2013.01) | |
| *G08B 23/00* | (2006.01) | |
| *G06Q 10/02* | (2012.01) | |
| *H04L 9/32* | (2006.01) | |
| *H04L 12/26* | (2006.01) | |
| *G06Q 30/02* | (2012.01) | |
| *H04L 43/04* | (2022.01) | |
| *H04L 43/06* | (2022.01) | |

(52) U.S. Cl.
CPC .............. *G06F 21/44* (2013.01); *G06F 21/57* (2013.01); *G06F 21/577* (2013.01); *G06Q 30/0241* (2013.01); *H04L 43/04* (2013.01); *H04L 43/06* (2013.01)

(58) Field of Classification Search
CPC ........ G06F 21/44; G06F 21/57; G06F 21/577; G06O 30/0241
See application file for complete search history.

(56) References Cited

U.S. PATENT DOCUMENTS

| | | | |
|---|---|---|---|
| 5,319,776 A | 6/1994 | Hile et al. | |
| 5,574,775 A | 11/1996 | Miller, II et al. | |
| 5,715,518 A | 2/1998 | Barrere et al. | |
| 6,092,194 A | 7/2000 | Touboul | |
| 6,167,520 A | 12/2000 | Touboul | |
| 6,185,689 B1 | 2/2001 | Todd, Sr. et al. | |
| 6,269,456 B1 | 7/2001 | Hodges et al. | |
| 6,272,353 B1 | 8/2001 | Dicker et al. | |
| 6,301,668 B1 | 10/2001 | Gleichauf et al. | |
| 6,453,345 B2 | 9/2002 | Trcka et al. | |
| 6,476,828 B1 | 11/2002 | Burkett et al. | |
| 6,480,962 B1 | 11/2002 | Touboul | |
| 6,502,131 B1 | 12/2002 | Vaid et al. | |
| 6,529,143 B2 | 3/2003 | Mikkola et al. | |
| 6,658,393 B1 | 12/2003 | Basch et al. | |
| 6,696,941 B2 | 2/2004 | Baker | |
| 6,707,476 B1 | 3/2004 | Hochstedler | |
| 6,748,195 B1 | 6/2004 | Phillips | |
| 6,792,543 B2 | 9/2004 | Pak et al. | |
| 6,804,780 B1 | 10/2004 | Touboul | |
| 6,892,225 B1 | 5/2005 | Tu et al. | |
| 6,907,530 B2 | 6/2005 | Wang | |
| 6,959,184 B1 | 10/2005 | Byers et al. | |
| 7,020,895 B2 | 3/2006 | Albrecht | |
| 7,023,383 B2 | 4/2006 | Stilp et al. | |
| 7,069,589 B2 | 6/2006 | Schmall et al. | |
| 7,096,368 B2 | 8/2006 | Kouznetsov et al. | |
| 7,123,933 B2 | 10/2006 | Poor et al. | |
| 7,127,455 B2 | 10/2006 | Carson et al. | |
| 7,139,820 B1 | 11/2006 | O'Toole, Jr. et al. | |
| 7,159,036 B2 | 1/2007 | Hinchliffe et al. | |
| 7,159,237 B2 | 1/2007 | Schneier et al. | |
| 7,171,690 B2 | 1/2007 | Kouznetsov et al. | |
| 7,178,166 B1 | 2/2007 | Taylor et al. | |
| 7,181,252 B2 | 2/2007 | Komsi | |
| 7,203,909 B1 | 4/2007 | Horvitz et al. | |
| 7,210,168 B2 | 4/2007 | Hursey et al. | |
| 7,228,566 B2 | 6/2007 | Caceres et al. | |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,266,845 B2 | 9/2007 | Hypponen | |
| 7,290,276 B2 | 10/2007 | Ogata | |
| 7,304,570 B2 | 12/2007 | Thomas et al. | |
| 7,305,245 B2 | 12/2007 | Alizadeh-Shabdiz et al. | |
| 7,308,256 B2 | 12/2007 | Morota et al. | |
| 7,308,712 B2 | 12/2007 | Banzhof | |
| 7,325,249 B2 | 1/2008 | Sutton, Jr. et al. | |
| 7,346,605 B1 | 3/2008 | Hepworth et al. | |
| 7,355,981 B2 | 4/2008 | Jorgenson | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 | 6/2008 | Szor | |
| 7,397,424 B2 | 7/2008 | Houri | |
| 7,397,434 B2 | 7/2008 | Mun et al. | |
| 7,401,064 B1 | 7/2008 | Arone et al. | |
| 7,401,359 B2 | 7/2008 | Gartside et al. | |
| 7,403,762 B2 | 7/2008 | Morgan et al. | |
| 7,414,988 B2 | 8/2008 | Jones et al. | |
| 7,415,270 B2 | 8/2008 | Wilhelmsson et al. | |
| 7,415,536 B2 | 8/2008 | Nakazawa | |
| 7,433,694 B2 | 10/2008 | Morgan et al. | |
| 7,437,158 B2 | 10/2008 | Russell | |
| 7,467,206 B2 | 12/2008 | Moore et al. | |
| 7,471,954 B2 | 12/2008 | Brachet et al. | |
| 7,472,422 B1 | 12/2008 | Agbabian | |
| 7,474,897 B2 | 1/2009 | Morgan et al. | |
| 7,493,127 B2 | 2/2009 | Morgan et al. | |
| 7,493,403 B2 | 2/2009 | Shull et al. | |
| 7,502,620 B2 | 3/2009 | Morgan et al. | |
| 7,515,578 B2 | 4/2009 | Alizadeh-Shabdiz et al. | |
| 7,525,541 B2 | 4/2009 | Chun et al. | |
| 7,526,297 B1 | 4/2009 | Holur et al. | |
| 7,539,882 B2 | 5/2009 | Jessup et al. | |
| 7,551,579 B2 | 6/2009 | Alizadeh-Shabdiz et al. | |
| 7,551,929 B2 | 6/2009 | Alizadeh-Shabdiz et al. | |
| 7,568,220 B2 | 7/2009 | Burshan | |
| 7,610,273 B2 | 10/2009 | Kuppusamy et al. | |
| 7,634,800 B2 | 12/2009 | Ide et al. | |
| 7,685,132 B2 | 3/2010 | Hyman | |
| 7,685,629 B1 | 3/2010 | White et al. | |
| 7,696,923 B2 | 4/2010 | Houri | |
| 7,761,583 B2 | 7/2010 | Shull et al. | |
| 7,768,963 B2 | 8/2010 | Alizadeh-Shabdiz | |
| 7,769,396 B2 | 8/2010 | Alizadeh-Shabdiz et al. | |
| 7,774,637 B1 | 8/2010 | Beddoe et al. | |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,809,936 B2 | 10/2010 | Einloth et al. | |
| 7,813,745 B2 | 10/2010 | Li | |
| 7,818,017 B2 | 10/2010 | Alizadeh-Shabdiz et al. | |
| 7,818,800 B1 * | 10/2010 | Lemley, III ............ | G06F 21/50 726/22 |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,865,937 B1 | 1/2011 | White et al. | |
| 7,877,784 B2 | 1/2011 | Chow et al. | |
| 7,882,247 B2 | 2/2011 | Sturniolo et al. | |
| 7,882,557 B2 | 2/2011 | Coskun et al. | |
| 7,890,938 B2 | 2/2011 | Jensen et al. | |
| 7,907,966 B1 | 3/2011 | Mammen | |
| 7,916,661 B2 | 3/2011 | Alizadeh-Shabdiz et al. | |
| 7,978,691 B1 | 7/2011 | Cole | |
| 7,991,854 B2 | 8/2011 | Bahl | |
| 7,999,742 B2 | 8/2011 | Alizadeh-Shabdiz | |
| 8,001,610 B1 | 8/2011 | Chickering et al. | |
| 8,014,788 B2 | 9/2011 | Alizadeh-Shabdiz et al. | |
| 8,019,357 B2 | 9/2011 | Alizadeh-Shabdiz et al. | |
| 8,024,711 B2 | 9/2011 | Albahari et al. | |
| 8,031,657 B2 | 10/2011 | Jones et al. | |
| 8,037,203 B2 | 10/2011 | Accapadi et al. | |
| 8,042,178 B1 | 10/2011 | Fisher et al. | |
| 8,054,219 B2 | 11/2011 | Alizadeh-Shabdiz | |
| 8,087,067 B2 | 12/2011 | Mahaffey et al. | |

(56) References Cited

U.S. PATENT DOCUMENTS

| | | |
|---|---|---|
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz et al. |
| 8,091,120 B2 | 1/2012 | Perrella et al. |
| 8,095,172 B1 | 1/2012 | Cole et al. |
| 8,099,764 B2 | 1/2012 | Herzog et al. |
| 8,108,555 B2 | 1/2012 | Awadallah et al. |
| 8,112,797 B2 | 2/2012 | Coskun et al. |
| 8,121,617 B1 | 2/2012 | LaGrotta et al. |
| 8,126,456 B2 | 2/2012 | Lotter et al. |
| 8,126,866 B1 | 2/2012 | Barton et al. |
| 8,127,158 B2 | 2/2012 | Jessup et al. |
| 8,127,350 B2 | 2/2012 | Wei et al. |
| 8,127,358 B1 | 2/2012 | Lee |
| 8,135,395 B2 | 3/2012 | Cassett et al. |
| 8,195,196 B2 | 6/2012 | Haran et al. |
| 8,200,773 B2 | 6/2012 | Bluestone et al. |
| 8,214,910 B1 | 7/2012 | Gossweiler, III et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,321,949 B1 | 11/2012 | Green et al. |
| 8,332,922 B2 | 12/2012 | Dickinson et al. |
| 8,346,860 B2 | 1/2013 | Berg et al. |
| 8,356,080 B2 | 1/2013 | Luna et al. |
| 8,359,016 B2 | 1/2013 | Lindeman et al. |
| 8,364,785 B2 | 1/2013 | Plamondon |
| 8,365,252 B2 | 1/2013 | Mahaffey et al. |
| 8,370,580 B2 | 2/2013 | Mobarak et al. |
| 8,370,933 B1 | 2/2013 | Buckler |
| 8,370,942 B1 | 2/2013 | Peterson et al. |
| 8,397,301 B2 | 3/2013 | Hering et al. |
| 8,401,521 B2 | 3/2013 | Bennett et al. |
| 8,412,626 B2 | 4/2013 | Hirson et al. |
| 8,434,151 B1 | 4/2013 | Franklin |
| 8,447,856 B2 | 5/2013 | Drako |
| 8,452,956 B1 | 5/2013 | Kersey et al. |
| 8,463,915 B1 | 6/2013 | Kim |
| 8,464,335 B1 | 6/2013 | Sinha et al. |
| 8,484,332 B2 | 7/2013 | Bush et al. |
| 8,504,775 B2 | 8/2013 | Plamondon |
| 8,505,102 B1 | 8/2013 | Cannings et al. |
| 8,561,144 B2 | 10/2013 | Mahaffey et al. |
| 8,589,691 B1 | 11/2013 | Hackborn et al. |
| 8,635,701 B2 | 1/2014 | Hilaiel et al. |
| 8,650,558 B2 | 2/2014 | DePoy |
| 8,650,649 B1 * | 2/2014 | Chen .................. G06F 21/64 726/24 |
| 8,683,605 B1 * | 3/2014 | Tenenboym ........... G06F 21/64 726/26 |
| 8,701,192 B1 | 4/2014 | Glick et al. |
| 8,756,432 B1 * | 6/2014 | Chen .................. G06F 21/51 713/188 |
| 8,806,641 B1 * | 8/2014 | Li ..................... G06F 21/562 726/24 |
| 8,806,643 B2 | 8/2014 | Nachenberg |
| 8,806,647 B1 | 8/2014 | Daswani et al. |
| 8,814,650 B2 | 8/2014 | Cockerille et al. |
| 8,843,627 B1 | 9/2014 | Baldi et al. |
| 8,843,752 B1 | 9/2014 | Priyadarshi et al. |
| 8,868,915 B2 | 10/2014 | Counterman |
| 8,914,893 B2 | 12/2014 | Zhao et al. |
| 8,949,243 B1 | 2/2015 | Kashyap et al. |
| 8,950,002 B2 | 2/2015 | Radhakrishnan et al. |
| 8,973,088 B1 | 3/2015 | Leung et al. |
| 8,990,933 B1 | 3/2015 | Magdalin |
| 8,997,181 B2 | 3/2015 | Mahaffey et al. |
| 9,043,919 B2 | 5/2015 | Wyatt et al. |
| 9,069,943 B2 | 6/2015 | Radhakrishnan et al. |
| 9,159,065 B2 | 10/2015 | Radhakrishnan |
| 9,166,966 B2 | 10/2015 | Radhakrishnan |
| 9,208,215 B2 | 12/2015 | Mahaffey et al. |
| 9,215,074 B2 | 12/2015 | Wyatt et al. |
| 9,294,284 B1 * | 3/2016 | Mao .................. G06F 21/105 |
| 9,349,015 B1 | 5/2016 | Archer et al. |
| 9,378,373 B2 | 6/2016 | Sobel |
| 9,407,443 B2 | 8/2016 | Wyatt et al. |
| 9,407,640 B2 | 8/2016 | Mahaffey et al. |
| 9,495,194 B1 | 11/2016 | Twitchell, Jr. et al. |
| 9,537,886 B1 | 1/2017 | Gareau |
| 9,589,129 B2 | 3/2017 | Richardson et al. |
| 9,635,028 B2 | 4/2017 | Shepard et al. |
| 9,736,147 B1 | 8/2017 | Mead |
| 9,824,353 B2 | 11/2017 | Li |
| 9,867,043 B2 | 1/2018 | Aissi |
| 9,940,454 B2 | 4/2018 | Richardson et al. |
| 9,948,744 B1 | 4/2018 | Billau et al. |
| 9,992,025 B2 | 6/2018 | Mahaffey et al. |
| 10,218,697 B2 | 2/2019 | Cockerill et al. |
| 10,225,740 B2 | 3/2019 | Bansal et al. |
| 10,256,979 B2 | 4/2019 | Mahaffey et al. |
| 10,387,269 B2 | 8/2019 | Muller et al. |
| 10,409,984 B1 | 9/2019 | McCauley et al. |
| 10,419,222 B2 | 9/2019 | Mahaffey et al. |
| 10,540,494 B2 | 1/2020 | Richardson et al. |
| 10,652,024 B2 | 5/2020 | Holness |
| 11,038,876 B2 | 6/2021 | Cockerill et al. |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0087882 A1 | 7/2002 | Schneier et al. |
| 2002/0108005 A1 | 8/2002 | Larson et al. |
| 2002/0108058 A1 | 8/2002 | Iwamura |
| 2002/0183060 A1 | 12/2002 | Ko et al. |
| 2002/0191018 A1 | 12/2002 | Broussard |
| 2002/0194473 A1 | 12/2002 | Pope et al. |
| 2003/0028803 A1 | 2/2003 | Bunker et al. |
| 2003/0046134 A1 | 3/2003 | Frolick et al. |
| 2003/0070091 A1 | 4/2003 | Loveland |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2003/0233566 A1 | 12/2003 | Kouznetsov et al. |
| 2004/0022258 A1 | 2/2004 | Tsukada et al. |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0205419 A1 | 10/2004 | Liang et al. |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0010921 A1 | 1/2005 | Sueyoshi |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0131900 A1 | 6/2005 | Palliyll et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0182792 A1 | 8/2005 | Israel et al. |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2005/0288043 A1 | 12/2005 | Lai et al. |
| 2006/0026283 A1 | 2/2006 | Trueba |
| 2006/0048142 A1 | 3/2006 | Roese et al. |
| 2006/0073820 A1 | 4/2006 | Craswell et al. |

(56) References Cited

U.S. PATENT DOCUMENTS

| | | |
|---|---|---|
| 2006/0075388 A1 | 4/2006 | Kelley et al. |
| 2006/0080680 A1 | 4/2006 | Anwar et al. |
| 2006/0094403 A1 | 5/2006 | Norefors et al. |
| 2006/0095454 A1 | 5/2006 | Shankar et al. |
| 2006/0101518 A1 | 5/2006 | Schumaker et al. |
| 2006/0129601 A1 | 6/2006 | Chang et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0191011 A1 | 8/2006 | Korkishko et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011192 A1 | 1/2007 | Barton |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028302 A1 | 2/2007 | Brennan et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0039053 A1 | 2/2007 | Dvir |
| 2007/0050471 A1 | 3/2007 | Patel et al. |
| 2007/0067581 A1* | 3/2007 | Baek .................. G06F 9/4406 711/153 |
| 2007/0071238 A1 | 3/2007 | Adams et al. |
| 2007/0074033 A1 | 3/2007 | Adams et al. |
| 2007/0074034 A1 | 3/2007 | Adams et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0094260 A1 | 4/2007 | Murphy et al. |
| 2007/0113090 A1 | 5/2007 | Villela |
| 2007/0143851 A1 | 6/2007 | Nicodemus et al. |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186275 A1 | 8/2007 | Shahbazi |
| 2007/0186282 A1 | 8/2007 | Jenkins |
| 2007/0190995 A1 | 8/2007 | Wang et al. |
| 2007/0192608 A1 | 8/2007 | De Arruda Villela |
| 2007/0214245 A1 | 9/2007 | Hamalainen et al. |
| 2007/0214504 A1 | 9/2007 | Milani Comparetti et al. |
| 2007/0217582 A1 | 9/2007 | Lesser |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0270212 A1 | 11/2007 | Cockerille et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0098478 A1* | 4/2008 | Vaidya .................. G06F 21/34 726/24 |
| 2008/0109871 A1 | 5/2008 | Jacobs |
| 2008/0120611 A1 | 5/2008 | Aaron |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0147799 A1 | 6/2008 | Morris |
| 2008/0148381 A1 | 6/2008 | Aaron |
| 2008/0165952 A1 | 7/2008 | Smith et al. |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0271149 A1 | 10/2008 | Dettinger et al. |
| 2008/0275992 A1 | 11/2008 | Basty et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1* | 12/2008 | Featherstone ..... H04M 1/72454 455/418 |
| 2008/0320312 A1 | 12/2008 | Duffus et al. |
| 2009/0019546 A1 | 1/2009 | Park et al. |
| 2009/0064303 A1 | 3/2009 | Dickinson et al. |
| 2009/0064330 A1 | 3/2009 | Shraim et al. |
| 2009/0070283 A1 | 3/2009 | Kang et al. |
| 2009/0083852 A1 | 3/2009 | Kuo et al. |
| 2009/0106439 A1 | 4/2009 | Twitchell, Jr. |
| 2009/0119143 A1 | 5/2009 | Silver et al. |
| 2009/0132689 A1 | 5/2009 | Zaltzman et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0210702 A1 | 8/2009 | Welingkar et al. |
| 2009/0247122 A1 | 10/2009 | Fitzgerald et al. |
| 2009/0248623 A1 | 10/2009 | Adelman et al. |
| 2009/0282485 A1 | 11/2009 | Bennett |
| 2009/0292487 A1 | 11/2009 | Duncan et al. |
| 2009/0293125 A1 | 11/2009 | Szor |
| 2009/0303066 A1 | 12/2009 | Lee et al. |
| 2009/0319998 A1 | 12/2009 | Sobel et al. |
| 2010/0005291 A1 | 1/2010 | Hulten et al. |
| 2010/0009758 A1 | 1/2010 | Twitchell, Jr. |
| 2010/0011029 A1* | 1/2010 | Niemela ............... H04L 63/145 707/E17.044 |
| 2010/0019731 A1 | 1/2010 | Connolly et al. |
| 2010/0041946 A1 | 2/2010 | Kim |
| 2010/0058468 A1* | 3/2010 | Green .................. G06F 21/51 726/22 |
| 2010/0064341 A1 | 3/2010 | Aldera |
| 2010/0064344 A1 | 3/2010 | Wang |
| 2010/0085883 A1 | 4/2010 | Paster |
| 2010/0088398 A1 | 4/2010 | Plamondon |
| 2010/0097494 A1 | 4/2010 | Gum et al. |
| 2010/0100591 A1 | 4/2010 | Mahaffey et al. |
| 2010/0100939 A1* | 4/2010 | Mahaffey .............. G06F 21/577 726/4 |
| 2010/0100959 A1 | 4/2010 | Mahaffey |
| 2010/0100963 A1 | 4/2010 | Mahaffey |
| 2010/0100964 A1 | 4/2010 | Mahaffey et al. |
| 2010/0114634 A1 | 5/2010 | Christiansen et al. |
| 2010/0130233 A1 | 5/2010 | Parker |
| 2010/0138501 A1 | 6/2010 | Clinton et al. |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0240419 A1 | 9/2010 | Horino |

(56) References Cited

U.S. PATENT DOCUMENTS

| | | |
|---|---|---|
| 2010/0250603 A1 | 9/2010 | Balakrishnaiah et al. |
| 2010/0299292 A1* | 11/2010 | Collazo ............... G06F 21/577 706/14 |
| 2010/0299738 A1 | 11/2010 | Wahl |
| 2010/0313270 A1 | 12/2010 | Kim et al. |
| 2010/0317324 A1 | 12/2010 | Brown et al. |
| 2010/0325035 A1 | 12/2010 | Hilgers et al. |
| 2010/0332593 A1 | 12/2010 | Barash et al. |
| 2011/0022681 A1 | 1/2011 | Simeonov |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0099377 A1 | 4/2011 | Hoornaert et al. |
| 2011/0107414 A1 | 5/2011 | Diab et al. |
| 2011/0113242 A1 | 5/2011 | McCormack |
| 2011/0119765 A1 | 5/2011 | Hering et al. |
| 2011/0131204 A1* | 6/2011 | Bodin ............... G06F 16/3326 707/727 |
| 2011/0141276 A1 | 6/2011 | Borghei |
| 2011/0145920 A1 | 6/2011 | Mahaffey et al. |
| 2011/0154439 A1 | 6/2011 | Patel et al. |
| 2011/0159845 A1 | 6/2011 | Sanjeev |
| 2011/0167474 A1 | 7/2011 | Sinha et al. |
| 2011/0171923 A1 | 7/2011 | Daly et al. |
| 2011/0173071 A1 | 7/2011 | Meyer et al. |
| 2011/0179136 A1 | 7/2011 | Twitchell, Jr. |
| 2011/0235624 A1 | 9/2011 | Scott et al. |
| 2011/0241872 A1 | 10/2011 | Mahaffey |
| 2011/0270766 A1 | 11/2011 | Ramakrishnan et al. |
| 2011/0296401 A1 | 12/2011 | DePoy |
| 2011/0296510 A1 | 12/2011 | Hatlelid et al. |
| 2011/0307711 A1* | 12/2011 | Novak ............... G06F 21/575 713/188 |
| 2011/0314542 A1 | 12/2011 | Viswanathan et al. |
| 2011/0320307 A1* | 12/2011 | Mehta ............... G06Q 30/0641 705/26.7 |
| 2012/0005476 A1* | 1/2012 | Wei ............... H04L 63/0272 713/153 |
| 2012/0011439 A1 | 1/2012 | Holger et al. |
| 2012/0023583 A1 | 1/2012 | Sallam |
| 2012/0042257 A1 | 2/2012 | Aftab et al. |
| 2012/0042382 A1 | 2/2012 | Mahaffey |
| 2012/0054277 A1 | 3/2012 | Gedikian |
| 2012/0054847 A1 | 3/2012 | Schultz et al. |
| 2012/0059822 A1 | 3/2012 | Malandain et al. |
| 2012/0060222 A1 | 3/2012 | Mahaffey et al. |
| 2012/0072569 A1 | 3/2012 | Xu |
| 2012/0084195 A1 | 4/2012 | Bauerschmidt et al. |
| 2012/0084836 A1 | 4/2012 | Mahaffey et al. |
| 2012/0084864 A1 | 4/2012 | Mahaffey et al. |
| 2012/0089963 A1 | 4/2012 | Claussen et al. |
| 2012/0096516 A1 | 4/2012 | Sobel et al. |
| 2012/0096555 A1 | 4/2012 | Mahaffey |
| 2012/0102568 A1 | 4/2012 | Tarbotton et al. |
| 2012/0110174 A1 | 5/2012 | Wootton et al. |
| 2012/0110345 A1 | 5/2012 | Pigeon et al. |
| 2012/0117386 A1* | 5/2012 | Headley ............... H04L 9/32 713/176 |
| 2012/0124239 A1 | 5/2012 | Shribman et al. |
| 2012/0129503 A1 | 5/2012 | Lindeman et al. |
| 2012/0159434 A1* | 6/2012 | Dang ............... G06F 8/751 717/120 |
| 2012/0159578 A1 | 6/2012 | Chawla et al. |
| 2012/0159607 A1 | 6/2012 | Wei et al. |
| 2012/0159636 A1 | 6/2012 | Pandya et al. |
| 2012/0166276 A1* | 6/2012 | Chitnis ............... G06Q 30/0251 705/14.49 |
| 2012/0173680 A1 | 7/2012 | Coskun et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0204033 A1 | 8/2012 | Etchegoyen et al. |
| 2012/0210431 A1 | 8/2012 | Mika et al. |
| 2012/0214451 A1 | 8/2012 | Richardson et al. |
| 2012/0215938 A1 | 8/2012 | Fletcher et al. |
| 2012/0216292 A1 | 8/2012 | Richardson et al. |
| 2012/0222120 A1* | 8/2012 | Rim ............... G06F 21/566 726/24 |
| 2012/0233674 A1 | 9/2012 | Gladstone et al. |
| 2012/0233694 A1* | 9/2012 | Baliga ............... G06F 21/568 726/23 |
| 2012/0233695 A1 | 9/2012 | Mahaffey et al. |
| 2012/0240183 A1* | 9/2012 | Sinha ............... H04L 63/1425 726/1 |
| 2012/0246499 A1 | 9/2012 | Jessup et al. |
| 2012/0254285 A1 | 10/2012 | Tiger et al. |
| 2012/0259954 A1 | 10/2012 | McCarthy et al. |
| 2012/0278467 A1 | 11/2012 | Schneider |
| 2012/0290584 A1* | 11/2012 | De Bona ............... G06F 8/60 707/741 |
| 2012/0303735 A1 | 11/2012 | Raciborski et al. |
| 2012/0311659 A1 | 12/2012 | Narain et al. |
| 2012/0317153 A1 | 12/2012 | Parthasarathy et al. |
| 2012/0317233 A1 | 12/2012 | Redpath |
| 2012/0317266 A1 | 12/2012 | Abbott |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0042124 A1 | 2/2013 | Isozaki et al. |
| 2013/0047034 A1 | 2/2013 | Salomon et al. |
| 2013/0047195 A1 | 2/2013 | Radhakrishnan |
| 2013/0047224 A1 | 2/2013 | Radhakrishnan |
| 2013/0047242 A1 | 2/2013 | Radhakrishnan |
| 2013/0047253 A1 | 2/2013 | Radhakrishnan et al. |
| 2013/0054702 A1 | 2/2013 | Belchee et al. |
| 2013/0054796 A1 | 2/2013 | Baumback et al. |
| 2013/0054960 A1 | 2/2013 | Grab et al. |
| 2013/0055405 A1* | 2/2013 | Zhao ............... G06F 21/10 726/26 |
| 2013/0067054 A1 | 3/2013 | Pulleyn et al. |
| 2013/0073859 A1 | 3/2013 | Carlson et al. |
| 2013/0086682 A1 | 4/2013 | Mahaffey et al. |
| 2013/0090088 A1 | 4/2013 | Chevsky et al. |
| 2013/0097318 A1 | 4/2013 | Gladstone et al. |
| 2013/0097660 A1 | 4/2013 | Das et al. |
| 2013/0097706 A1 | 4/2013 | Titonis et al. |
| 2013/0097710 A1 | 4/2013 | Basavapatna et al. |
| 2013/0111597 A1 | 5/2013 | Gossweiler, III et al. |
| 2013/0117854 A1 | 5/2013 | Britton et al. |
| 2013/0130649 A1 | 5/2013 | Mahaffey et al. |
| 2013/0132330 A1* | 5/2013 | Hurwitz ............... G06F 21/604 706/52 |
| 2013/0132565 A1* | 5/2013 | Cetin ............... H04W 12/37 709/224 |
| 2013/0144785 A1 | 6/2013 | Karpenko et al. |
| 2013/0152047 A1 | 6/2013 | Moorthi et al. |
| 2013/0155899 A1 | 6/2013 | Gallagher |
| 2013/0159719 A1* | 6/2013 | Ha ............... G06F 21/51 713/176 |
| 2013/0166899 A1 | 6/2013 | Courtney et al. |
| 2013/0167136 A1 | 6/2013 | Goldman |
| 2013/0178270 A1 | 7/2013 | Flaherty et al. |
| 2013/0191918 A1 | 7/2013 | Nachenberg |
| 2013/0212160 A1* | 8/2013 | Lawson ............... H04L 67/02 709/203 |
| 2013/0212684 A1* | 8/2013 | Li ............... G06F 16/22 726/25 |
| 2013/0227683 A1 | 8/2013 | Bettini et al. |
| 2013/0247217 A1 | 9/2013 | Junod et al. |
| 2013/0254889 A1 | 9/2013 | Stuntebeck |
| 2013/0276120 A1 | 10/2013 | Dalcher et al. |
| 2013/0283377 A1* | 10/2013 | Das ............... H04L 63/1441 726/23 |

(56) References Cited

U.S. PATENT DOCUMENTS

| | | |
|---|---|---|
| 2013/0290709 A1 | 10/2013 | Muppidi et al. |
| 2013/0298244 A1 | 11/2013 | Kumar et al. |
| 2013/0303154 A1 | 11/2013 | Gupta et al. |
| 2013/0318613 A1 | 11/2013 | Archer et al. |
| 2013/0318614 A1 | 11/2013 | Archer et al. |
| 2013/0325779 A1 | 12/2013 | Shahshahani et al. |
| 2013/0326476 A1 | 12/2013 | Wyatt et al. |
| 2013/0326477 A1 | 12/2013 | Wyatt et al. |
| 2013/0326500 A1 | 12/2013 | Park et al. |
| 2013/0333039 A1* | 12/2013 | Kelly ............... G06F 21/51 726/24 |
| 2013/0346760 A1 | 12/2013 | Ignatchenko |
| 2014/0006418 A1 | 1/2014 | Forte et al. |
| 2014/0006464 A1 | 1/2014 | Pitts |
| 2014/0006796 A1 | 1/2014 | Smith et al. |
| 2014/0007222 A1 | 1/2014 | Qureshi et al. |
| 2014/0019241 A1 | 1/2014 | Treiser et al. |
| 2014/0019456 A1 | 1/2014 | Li et al. |
| 2014/0024348 A1 | 1/2014 | Hurst et al. |
| 2014/0041037 A1* | 2/2014 | Bhatia ............... G06F 21/10 726/26 |
| 2014/0066015 A1* | 3/2014 | Aissi ............... H04L 63/0876 455/411 |
| 2014/0082738 A1 | 3/2014 | Bahl |
| 2014/0090077 A1* | 3/2014 | Jeong ............... G06F 21/60 726/26 |
| 2014/0096246 A1 | 4/2014 | Morrissey et al. |
| 2014/0113588 A1 | 4/2014 | Chekina et al. |
| 2014/0115659 A1 | 4/2014 | Attfield et al. |
| 2014/0123289 A1 | 5/2014 | Hsiao et al. |
| 2014/0150096 A1* | 5/2014 | Moon ............... G06F 21/645 726/22 |
| 2014/0181973 A1 | 6/2014 | Lee et al. |
| 2014/0188886 A1 | 7/2014 | Mahaffey et al. |
| 2014/0189808 A1 | 7/2014 | Mahaffey et al. |
| 2014/0196104 A1 | 7/2014 | Chari et al. |
| 2014/0215628 A1 | 7/2014 | Yan |
| 2014/0244318 A1 | 8/2014 | Drake et al. |
| 2014/0283066 A1 | 9/2014 | Teddy et al. |
| 2014/0289833 A1 | 9/2014 | Briceno et al. |
| 2014/0317754 A1* | 10/2014 | Niemela ............... G06F 21/552 726/26 |
| 2014/0325586 A1 | 10/2014 | Halliday et al. |
| 2014/0331294 A1 | 11/2014 | Ramallo et al. |
| 2014/0359777 A1 | 12/2014 | Lam et al. |
| 2014/0379853 A1 | 12/2014 | Shelton |
| 2014/0380422 A1 | 12/2014 | Su |
| 2014/0380484 A1 | 12/2014 | Choi et al. |
| 2015/0007325 A1 | 1/2015 | Eliseev et al. |
| 2015/0046339 A1 | 2/2015 | Wong et al. |
| 2015/0067143 A1 | 3/2015 | Babakhan et al. |
| 2015/0067830 A1* | 3/2015 | Johansson ............... G06F 21/568 726/22 |
| 2015/0067831 A1 | 3/2015 | Wawda et al. |
| 2015/0067855 A1 | 3/2015 | Lee et al. |
| 2015/0074390 A1* | 3/2015 | Stoback ............... H04L 63/1483 713/156 |
| 2015/0088955 A1 | 3/2015 | Hendrick et al. |
| 2015/0089585 A1 | 3/2015 | Novack |
| 2015/0095990 A1 | 4/2015 | Ranganathan et al. |
| 2015/0135338 A1* | 5/2015 | Moskal ............... G06F 21/33 726/30 |
| 2015/0169877 A1 | 6/2015 | Mahaffey et al. |
| 2015/0172057 A1 | 6/2015 | Mahaffey et al. |
| 2015/0172060 A1 | 6/2015 | Mahaffey et al. |
| 2015/0172146 A1 | 6/2015 | Mahaffey et al. |
| 2015/0186892 A1 | 7/2015 | Zhang et al. |
| 2015/0188924 A1 | 7/2015 | Mahaffey et al. |
| 2015/0193781 A1 | 7/2015 | Dave et al. |
| 2015/0220734 A1* | 8/2015 | Nalluri ............... G06F 21/6218 726/23 |
| 2015/0229651 A1 | 8/2015 | Nicodemus et al. |
| 2015/0235015 A1 | 8/2015 | Holler et al. |
| 2015/0244737 A1 | 8/2015 | Siman |
| 2015/0256550 A1 | 9/2015 | Taylor et al. |
| 2015/0324616 A1 | 11/2015 | Alarabi |
| 2015/0326586 A1 | 11/2015 | Khesin |
| 2016/0021135 A1 | 1/2016 | Chesla et al. |
| 2016/0027011 A1 | 1/2016 | Ninomiya et al. |
| 2016/0080408 A1 | 3/2016 | Coleman et al. |
| 2016/0086184 A1 | 3/2016 | Carpenter et al. |
| 2016/0099963 A1 | 4/2016 | Mahaffey et al. |
| 2016/0099972 A1 | 4/2016 | Qureshi et al. |
| 2016/0119195 A1 | 4/2016 | Blondeau et al. |
| 2016/0142858 A1 | 5/2016 | Molinet et al. |
| 2016/0192154 A1 | 6/2016 | Modica et al. |
| 2016/0226872 A1 | 8/2016 | Oberheide et al. |
| 2016/0239650 A1 | 8/2016 | Mao et al. |
| 2016/0321452 A1 | 11/2016 | Richardson et al. |
| 2016/0344729 A1 | 11/2016 | Slaight et al. |
| 2016/0352526 A1 | 12/2016 | Adler et al. |
| 2016/0366586 A1 | 12/2016 | Gross et al. |
| 2016/0373478 A1 | 12/2016 | Doubleday et al. |
| 2017/0024135 A1 | 1/2017 | Christodorescu et al. |
| 2017/0041036 A1 | 2/2017 | Phung et al. |
| 2017/0060497 A1 | 3/2017 | Maezawa |
| 2017/0063865 A1 | 3/2017 | Belchee et al. |
| 2017/0075677 A1 | 3/2017 | Gross et al. |
| 2017/0103215 A1 | 4/2017 | Mahaffey et al. |
| 2017/0104790 A1 | 4/2017 | Meyers et al. |
| 2017/0126696 A1 | 5/2017 | Duffell et al. |
| 2017/0134412 A1 | 5/2017 | Cheng et al. |
| 2017/0146970 A1 | 5/2017 | Joo et al. |
| 2017/0147810 A1 | 5/2017 | Richardson et al. |
| 2017/0163616 A1 | 6/2017 | Smith et al. |
| 2017/0230402 A1 | 8/2017 | Greenspan et al. |
| 2017/0255932 A1 | 9/2017 | Aabye et al. |
| 2017/0262609 A1 | 9/2017 | Perlroth et al. |
| 2017/0289139 A1 | 10/2017 | Guo et al. |
| 2017/0318000 A1 | 11/2017 | Louis et al. |
| 2017/0331828 A1 | 11/2017 | Caldera et al. |
| 2017/0332238 A1 | 11/2017 | Bansal et al. |
| 2017/0345004 A1 | 11/2017 | Cowan |
| 2017/0359306 A1 | 12/2017 | Thomas et al. |
| 2017/0366553 A1 | 12/2017 | Shetye et al. |
| 2018/0025344 A1 | 1/2018 | L. et al. |
| 2018/0026944 A1 | 1/2018 | Phillips |
| 2018/0026976 A1 | 1/2018 | White et al. |
| 2018/0054417 A1 | 2/2018 | Schibuk et al. |
| 2018/0054433 A1 | 2/2018 | Junod et al. |
| 2018/0082301 A1 | 3/2018 | Chan-Bauza et al. |
| 2018/0082302 A1 | 3/2018 | Chan-Bauza et al. |
| 2018/0082303 A1 | 3/2018 | Chan-Bauza et al. |
| 2018/0189478 A1 | 7/2018 | Richardson et al. |
| 2018/0198629 A1 | 7/2018 | Deymonnaz et al. |
| 2018/0294969 A1 | 10/2018 | Holness |
| 2018/0316598 A1 | 11/2018 | Twitchell, Jr. |
| 2018/0359244 A1 | 12/2018 | Cockerill et al. |
| 2019/0141030 A1 | 5/2019 | Cockerill et al. |
| 2019/0274042 A1 | 9/2019 | Gupta et al. |
| 2019/0294464 A1 | 9/2019 | Twitchell, Jr. et al. |
| 2020/0089869 A1 | 3/2020 | Richardson et al. |
| 2021/0258304 A1 | 8/2021 | Cockerill et al. |

FOREIGN PATENT DOCUMENTS

| | | |
|---|---|---|
| EP | 2884784 | 6/2015 |
| GB | 2430588 | 3/2007 |
| KR | 1020090044656 | 5/2009 |
| KR | 101143999 | 5/2012 |
| WO | 2001010089 | 2/2001 |
| WO | 2005101789 | 10/2005 |
| WO | 2006110181 | 10/2006 |
| WO | 2008007111 | 3/2007 |
| WO | 2007081356 | 7/2007 |
| WO | 2008057737 | 5/2008 |
| WO | 2010048218 | 4/2010 |
| WO | 2010048220 | 4/2010 |
| WO | 2012027588 | 1/2012 |
| WO | 2013147891 | 10/2013 |

(56) References Cited

FOREIGN PATENT DOCUMENTS

| WO | 2014063124 | 4/2014 |
|---|---|---|
| WO | 2015101522 | 7/2015 |

OTHER PUBLICATIONS

U.S. Appl. No. 12/255,614.
Virus Total, VT Community, www.virustotal.com/index.html; Dated Dec. 16, 2011; 44 Pages.
Wendy Roll; Towards Model-Based and CCM-Based Applications for Real-Time Systems; 2003 IEEE; 8 pages; <http://ieeexplore.ieee.org/stamp/stamp.jsp?tp=&arnumber=1199238>.
Windows Update, Internet Archive, Way Back Machine, available at <http://web.archive.org/web/20071022193017/http://en.wikipedia.org/wiki/Windows_Update> Retrieved Feb. 23, 2011, 3 pages.
Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.
Xu, Zhi et al., "TapLogger: Inferring User Inputs on Smartphone Touchscreens Using On-board Motion Sensors", WISEC '12 Proceedings of the fifth ACM conference on Security and Privacy in Wireless and Mobile Networkspp. 113-124, Apr. 16, 2012.
Yan Matusevich, "Cerberus—Your Phone's Gaurdian Dog—Testing Android Apps—AndroidPit," www.androidpit.com/en/android/tests/test/392782/Cerberus-Your-Phone-s-Gaurdian-Dog, Retrieved Mar. 26, 2013; pp. 1-7.
Ivica Crnkovic et al.; A Classification Framework for Software Component Models; 2011 IEEE; pp. 593-615; <http://ieeexplore.ieee.org/stamp/stamp.jsp?tp=&arnumber=5587419>.
Techsplurge "Cerberus is the best Anti-Theft App for Android," techsplurge.com4703/cerberus-ladies-gentlemen-antitheft-app-android/, Retrieved Mar. 26, 2013; pp. 1-3.
"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview," available at http://us.blackberry.com/developers/platform/pushapi.isp#tab_tab_resources, retrieved on Sep. 14, 2011, published on Nov. 6, 2010, 21 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.
"Pidgin The Universal Chat Client," Pidign, available at http://www.pidgin.im/, retrieved Sep. 14, 2011, published on May 1, 2007, 14 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"ESoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"ZVeloDB URL Database," zVelo, available at https://zvelo.com/technology/zvelodb-url-database, retrieved Mar. 30, 2012, published on Jan. 21, 2012, 2 pages.
Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.
Final Office Action dated Feb. 1, 2011 for U.S. Appl. No. 12/255,626, filed Oct. 21, 2008; pp. 1-18.
Fleurey et al., "A Domain Specific Modeling Language Supporting Specification, Simulation and Execution of Dynamic Adaptive Systems", MODELS 2009, LNCS 5795, pp. 606-621,2009, Springer-Verlag Berlin Heidelberg.
Ghazarian et al., "Automatic detection of users' skill levels using high-frequency interface events", User Model User adap-ltnter 20, pp. 109-146, 2010, Springer Science+Business Mediea B.V.
Gianluigi Caldiera et al.; Identifying and Qualifying Reusable Software Components; 1991 IEEE; pp. 61-70; <http://ieeexplore.ieee.org/stamp/stamp.jsp?tp=&arnumber=67210>.
Grafio "Stay Secure," Opera Software, Sep. 29, 2008, available at <http://widgets.opera.com/widget/4495> retrieved Oct. 21, 2008, 4 pages.
HTC "Mobile Wipe Smart Phone Management", pp. 1-4, published on Dec. 5, 2007, retrieved on Dec. 5, 2007.
Hervas et al., "Towards the ubiquitous visualization: Adaptive user-interfaces based on the Semantic Web", Interacting with Computers 23, pp. 40-56, 2011, Elsevier B.V.
International Patent Application PCT/US2013/043569, International Search Report and Written Opinion, dated Aug. 27, 2013.
International Search Report and Written Opinion, International Application No. PCT/US2018/036562, dated Oct. 18, 2018.
J. S. Poulin et al.; The business case for software reuse; 1993 IBM; pp. 567-594; <http://ieeexplore.ieee.org/stamp/stamp.jsp?tp=&arnumber=5387336>.
Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.
Jan Bosch; Maturity and Evolution in Software Product Lines Approaches, Artefacts and Organization; 2002 Springer pp. 257-271; <http://link.springer.com/chapter/10.1007/3-540-45652-X_16>.
Jung, Jaeyeon et al. "DNS Performance and the Effectiveness of Caching," IEEE/ACM Transactions on Networking, vol. 10, Issue 5, Oct. 2002, pp. 589-603.
Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.
Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.
Kat Orphanides "Successfully retrieved my phone—which had been stolen & sold on—thanks to tracking data supplied by AVAST! when a new SIM was inserted, even after the phone had been rest to factory defaults by the thief," Google +, https://plus.google.com/103826845404274377007/posts/1xW5cd6DRzf, Retrieved Mar. 25, 2013; pp. 1-2.
Leiva Torres et al., "A Gesture Inference Methodology for User Evaluation Based on Mouse Activity Tracking", Proceedings of the IADIS International Conference Interfaces and Human Computer Interaction 2008, part of the IADIS Multi-Conference on Computer Science and Information Systems 2008, MCCSIS'08, pp. 18-26, IADIS Press, 2008.
Liljeberg, M. et al. "Optimizing World-Wide Web for Weakly Connected Mobile Workstations: An Indirect Approach," Second Internatioinal Workshop on Services Distributed and Networked Environments, Jun. 5-6, 1995, pp. 132-139.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
McAfee Artemis Technology—Always-On, Real-Time Protection, 2008.

(56) References Cited

OTHER PUBLICATIONS

McAfee Knowledge Base Corporate KB60224, last modified on Jan. 19, 2010.
McAfee Technical Brief zero day to real time, 2008.
McAfee, Internet Archive, Way Back Machine, available at <http://web.archive.org/web/20080517102505/www.mcafeesecure.com/us/technology-intro.jsp>, retrieved Feb. 23, 2011,2 pages.
Miluzzo, Emiliano et al., "TapPrints: Your Finger Taps Have Fingerprints", MobiSys '12 Proceedings of the 10th International conference on Mobile systems, applications, and services, pp. 323-336, Jun. 25, 2012.
Non-Final Office Action dated Dec. 26, 2012 for U.S. Appl. No. 13/160,382, filed Jun. 14, 2011; pp. 1-23.
Non-Final Office Action dated Mar. 24, 2011 for U.S. Appl. No. 12/255,635, filed Oct. 21, 2008; pp. 1-17.
Norton Insight a solution to Performance, published on Aug. 29, 2008.
Notice of Allowance dated Nov. 3, 2011 for U.S. Appl. No. 12/255,632, filed Oct. 21, 2008; pp. 1-5.
Ouellet, Eric. "Magic Quadrant for Content-Aware Data Loss Prevention." Gartner, Inc. Jan. 3, 2013; downloaded from http://www.gartner.com/technology/reprints.do?id=1-1DGFP7T&ct=1.
Owusu, Emmanuel, et al., "Password Inference using Accelerometers on Smartphones", HotMobile '12, Feb. 28, 2012.
PCT "International Search Report and Written Opinion of the International Searching Authority for PCT/US2013/027166", dated Jun. 19, 2013; received on Jun. 21, 2013.
PCT International Preliminary Report on Patentability for PCT/US2011/049182; dated Mar. 7, 2013; pp. 1-9.
PCT, "International Search Report and Written Opinion of the International Searching Authority for PCT/US2011/049182", dated Dec. 23, 2011.
Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.
PagerDuty, available at http://www.pagerduty.com, retrieved on Sep. 14, 2011, published on Jun. 6, 2009, 23 pages.
Paul Wilks "Cerberus anti theft—must-have security app to help find Lost or Stolen phone!", Dated Jun. 11, 2012; http://www.androidtapp.com/cerberus-anti-theft/, Retrieved Mar. 26, 2013; pp. 1-55.
Prey, available at http://preyproject.com/, retrieved Jan. 10, 2012, published on May 16, 2009, 4 pages.
Qualys, "Executive Dashboard," Internet Archive, Way back Machine, availble at <http://web.archive.org/web20080507161417/www.qualys.com/products/screens/?screen=Executive+Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.
Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.
Richard Lippmann et al.; The Effect of Identifying Vulnerabilities and Patching Software on the Utility of Network Intrusion Detection; 2002 Springer; pp. 307-326; <http://link.springer.com/chapter/10.1007/3-540-36084-0_17>.
Summerson, Cameron "5 Android Antivirus Apps Compared, Find out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.
Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.
Software Engineering Institute, Carnegie Mellon; "Securing Your Web Browser", Dormann et al., web page downloaded Nov. 4, 2013 from http://www.cert.org/tech_tips/securing_browser/, pp. 1-17.
Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.
Sprint Nextel, Mobile Locator, Internet Archive, Way Back Machine, available at http://web.archive.org/web/20080901070835/http://www.nextel.com/en/solutions/gps/mobile_locator.html, 2 pages, Retrieved Jan. 16, 2013.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Tedeschi, Bob, "In Choosing a New Phone, Online Research Goes Only so Far", The New York Times, Oct. 7, 2009; downloaded Jul. 13, 2013 from http://www.nytimes.com/2009/10/08/technology/personaltech/08smat.html?_r=0.
"Berry Locator", available at http://www.mobireport.com/apps/bl/, retrieved on Aug. 10, 2011, published Feb. 8, 2008.
International Patent Application PCT/US2016/028149, International Search Report and Written Opinion, dated May 17, 2016.
PCT International Search Report and Written Opinion of the International Searching Authority for PCT/US2009/061370; dated Dec. 14, 2009; pp. 1-12.
PCT International Search Report and Written Opinion of the International Searching Authority for PCT/US2009/061372; dated Mar. 24, 2010.
TippingPoint "TippingPoint Security Management System (SMS)", available at http://www.tippingpoint.com/products_sms.html, retrieved on Oct. 21, 2008, published on Mar. 31, 2005, 2 pages.
Expressing Intent to Control Behavior of Application Components, U.S. Appl. No. 13/786,210, filed Mar. 5, 2013, Timothy Wyatt, et al, U.S. Pat. No. 9,215,074, Dec. 15. 2015
Component Analysis of Software Applications of Computing Devices, U.S. Appl. No. 13/692,806, filed Dec. 3, 2012, Timothy Wyatt, et al, U.S. Pat. No. 9,407,443, Aug. 2, 2016.
User Classification Based on Data Gathered from a Computing Device, U.S. Appl. No. 13/728,189, filed Dec. 27, 2012, Kevin Mahaffey, et al, U.S. Pat. No. 9,208,215, Dec. 8, 2015.
Assessing Application Authenticity and Performing an Action in Response to an Evaluation Result, U.S. Appl. No. 14/105,950, filed Dec. 13, 2013, Kevin Mahaffey, et al, Docketed New Case—Ready for Examination, Apr. 7, 2018.
Monitoring Installed Applications on User Devices, U.S. Appl. No. 14/253,702, filed Apr. 15, 2014, Kevin Mahaffey, et al, U.S. Pat. No. 9,992,025, Jun. 5, 2018.
Identifying Manner of Usage for Software Assets in Applications on User Devices, U.S. Appl. No. 14/253,739, filed Apr. 15, 2014, Kevin Mahaffey, et al, Abandoned—Failure to Respond to an Office Action, Mar. 18, 2018.
Monitoring for Fraudulent or Harmful Behavior in Applications Being Installed on User Devices, U.S. Appl. No. 14/301,007, filed Jun. 10, 2014, Kevin Mahaffey, et al, Docketed New Case—Ready for Examination, Feb. 15, 2019.
Determining Source of Side-loaded Software, U.S. Appl. No. 14/731,273, filed Jun. 4, 2015, David Richardson, et al, U.S. Pat. No. 9,589,129, Mar. 7, 2017.
Determining Source of Side-loaded Software Using Signature of Authorship, U.S. Appl. No. 15/427,491, filed Feb. 8, 2017, David Richardson, et al, U.S. Pat. No. 9,940,454, Apr. 10, 2018.
Determining Source of Side-loaded Software Using an Administrator Server, U.S. Appl. No. 15/909,796, filed Mar. 1, 2018, David Richardson, et al, Docketed New Case—Ready for Examination, May 4, 2018.
Use of Device Risk Evaluation to Manage Access to Services, U.S. Appl. No. 15/619,356, filed Jun. 9, 2017, Aaron Cockerill, et al, Allowed—Notice of Allowance Not Yet Mailed, Oct. 31, 2018.

(56) References Cited

OTHER PUBLICATIONS

Managing Access to Services Based on Fingerprint Matching, U.S. Appl. No. 16/241,504, filed Jan. 7, 2019, Aaron Cockerill, et al, Docketed New Case—Ready for Examination, Feb. 1, 2019.
Crawling Multiple Markets and Correlating, U.S. Appl. No. 13/484,132, filed May 30, 2012, Timothy Wyatt, et al, U.S. Pat. No. 9,043,919, May 26, 2015.
"Cerberus anti theft LSDroid," https://play.google.com/store/apps/details?id=com.lsdroid.cerberus&hl=en; pp. 1-31.
"Data Leak Prevention." Symantec Data Loss Prevention. Downloaded from http://www.symantec.com/data-leak-prevention on Dec. 4, 2013.
"DeviceOrientation Event Specification", W3C, available at http://dev.w3.org/geo/api/spec-source-orientation, retrieved on Feb. 28, 2013, published on Jun. 13, 2012.
"Discover, monitor and protect your confidential data." Synmantec Data Loss Prevention. Posted on Nov. 22, 2013 at http://www.symantec.com/data-loss-prevention.
"F-Secure Mobile Security for S60 User's Guide," F-Secure Corporation 2009, 34 pages.
"Firefox," Wikipedia, Jul. 20, 2011, available at <http://en.wikipedia.org/wiki/firefox> retrieved Aug. 10, 2011, 37 pages.
"Five DLP Tips from Security Executives." Symantec Corporation. Downloaded from http://resources.idgenterprise.com/original/AST-0079952_SymantecFINAL.pdf on Dec. 4, 2013.
"I'm Aza Raskin@aza. I make shiny things. I simplify.", "Vote! How to Detect the Social Sites Your Visitors Use", web page downloaded Nov. 4, 2013 from http://www.ararask.in/blog/postlsocialhistoryjs, pp. 1-83.
"Java Virtual Machine," Wikipedia, Aug. 7, 2011, available at <http://en.wikipedia.org/wiki/Java_Virtual_Machine> retrieved Aug. 10, 2011, 7 pages.
"Kaspersky AV," Kaspersky Lab 1997-2007, 1 page.
"Kaspersky Mobile Security-Anti Theft", Kaspersky Lab 2008, available at http://www.kaspersky.com/kaspersky_mobile_security, 2 Pages.
"Kaspersky Mobile Security-Home Computer Security," Kaspersky Lab 2008, available at <http://www.kaspersky.com/kaspersky_mobile_security> , 1 pages.
"Norton Smartphone Security," Symantec, 2007, available at <http://www.symantec.com/norton/smartphone-security> retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Preventing attacks on a user's history through CSS: visited selectors", "How CSS can be used to query a user'sbrowser history", L. David Baron, Mozilla Corporation, web page downloaded Nov. 4, 2013 from http://dbaron.org/mozilla/visited-privacy, pp. 1-6.
"Real world Computing" Jun. 16, 2008 (PC Pro) pp. 1.
"Realtime Privacy Monitoring on Smartphones: TaintDroid Build Instructions for Android 4.1." Dec. 6, 2012. http://appanalysis.org/download.html.
"Remote SMS commands," http://myboyfriendisageek.com/market/gotya/, Retrieved Mar. 26, 2013; pp. 1-3.
"Sprint—Report that your device is lost or stolen", web page downloaded Apr. 11, 2013 from http://support.sprint.com/support/article/Report_that_your_device_is_lost_or_stolen/case-ba416758-20090629-143222.
"Symantec Endpoint Protection," Symantec, 2008, available at <http://www.symantec.com/business/products/family.isp?familyid=endpointsecurity>, 6 pages.
"Symantec Mobile Security Suite for Windows Mobile," Symantec, 2008, available at <http://www.symantec.com/business/products/sysreq.jsp?pcid=2241&pvid=mobile_security_suite_1>, 5 pages.
"Virgin Media—Phone Lost or Stolen?", web page downloaded Apr. 11, 2013 from http://www.virginmobile.com/vm/ukCoverage.do?contentId=insurance.howdoi.sm283.

"What's New in Symantec Data Loss Prevention 12." Data Sheet: Data Loss Prevention. Symantec. May 2013.
"Avast! Free Mobile Security Antivirus & Anti-Theft App for Android mobile & tablet," http://www.avast.com/free-mobile-security, Retrieved Mar. 26, 2013; pp. 1-6.
Alun Taylor "Cerberus—The Register," Dated Aug. 23, 2011; www.theregister.co.uk/2011/08/23/app_of_the_week_android_/, Retrieved Mar. 26, 2013; pp. 1-5.
Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.
Artem Russakovskii "Theft Aware 2.0—The Most Ingenious Android Security Solution With the Best Root Integration We've Seen to Date. Really Hands on Review," Dated Jul. 24, 2011; http://www.androidpolice.com/2010/11/29/theft-aware-2-0-the-most-ingenious-android-security-solution-with-the-best-root-integration-weve-seen-to-date-really-hand, Retrieved Mar. 26, 2013; pp. 1-13.
Benyon et al., "Applying user modelling to human-computer interaction design" AI Review 7, pp. 199-225,1993, Kluwer Academic Publishers.
COMODO Group, Inc. website history page using wayback machine, "Digital Code Signing, Code Signing Certificates—COMODO", May 11, 2013, p. 1-6.
Cai, Liang et al., "On the Practicality of Motion Based Keystroke Inference Attack", Trust and Trustworthy Computing Lecture Notes in Computer Science vol. 7344, 2012, pp. 273-290, Jun. 13, 2012.
Cai, Liang et al., "TouchLogger: Inferring Keystrokes on Touch Screen From Smartphone Motion", HotSec'11 Proceedings of the 6th USENIX conference on Hot topics in securitypp. 9-9.
Clickatell, available at http://www.clickatell.com, retrieved Sep. 14, 2011, published on Jan. 18, 2011, 11 pages.
Content Security Policy 1.0, "W3C Candidate Recommendation Nov. 15, 2012", web page downloaded Nov. 4, 2013 from http://www.w3.orgITR/CSP/, pp. 1-16.
Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Enck et al. "TaintDroid: An Information-Flow Tracking System for Realtime Privacy Monitoring on Smartphones." In Proceedings of OSDI 2010 (Oct. 2010). Downloaded from http://appanalysis.org/tdroid10.pdf.
European Patent Application 16789745.3, Extended Search Report, dated Aug. 1, 2018.
European Patent Application 13800352.0, Partial Search Report, dated Dec. 22, 2015.
European Patent Application No. 13800352.0, Extended European Search Report, dated May 17, 2016.
Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.
Extended European Search Report, EP18814342.4, dated Nov. 17, 2020.
Expressing Intent to Control Behavior of Application Components, U.S. Appl. No. 13/786,210, filed Mar. 5, 2013, Timothy Wyatt et al., Patented Case, Apr. 6, 2015.
Component Analysis of Software Applications on Computing Devices, U.S. Appl. No. 13/692,806, filed Dec. 3, 2012, Timothy Wyatt et al., Patented Case, Jul. 7, 2015.
User Classification Based on Data Gathered From a Computing Device, U.S. Appl. No. 13/728,189, filed Dec. 27, 2012, Kevin Mahaffey et al., Patented Case, Apr. 17, 2015.
Assessing Application Authenticity and Performing an Action in Response to an Evaluation Result, U.S. Appl. No. 14/105,950, filed Dec. 13, 2013, Kevin Mahaffey et al., Patented Case, May 18, 2018.

(56) References Cited

OTHER PUBLICATIONS

Monitoring Installed Applications on User Devices, U.S. Appl. No. 14/253,702, filed Apr. 15, 2014, Kevin Mahaffey et al., Patented Case, Aug. 30, 2017.

Identifying Manner of Usage for Software Assets in Applications on User Devices, U.S. Appl. No. 14/253,739, filed Apr. 15, 2014, Kevin Mahaffey et al., Abandoned—Failure to Respond to an Office Action, Aug. 10, 2017.

Monitoring for Fraudulent or Harmful Behavior in Applications Being Installed on User Devices, U.S. Appl. No. 14/301,007, filed Jun. 10, 2014, Kevin Mahaffey et al., Patented Case, Nov. 1, 2018.

Determining Source of Side-Loaded Software, U.S. Appl. No. 14/731,273, filed Jun. 4, 2015, David Richardson et al., Patented Case, Jun. 3, 2016.

Determining Source of Side-Loaded Software Using Signature of Authorship, U.S. Appl. No. 15/427,491, filed Feb. 8, 2017, David Richardson et al., Patented Case, Jul. 17, 2017.

Determining Source of Side-Loaded Software Using an Administrator Server, U.S. Appl. No. 15/9099,796, filed Mar. 1, 2018, David Richardson et al., Patented Case, May 6, 2019.

Determining a Security State Designation for a Computing Device Based on a Source of Software, U.S. Appl. No. 16/690,876, filed Nov. 21, 2019, David Richardson et al., Notice of Allowance Mailed—Application Received in Office of Publications, Jun. 23, 2021.

Use of Device Risk Evaluation to Manage Access to Services, U.S. Appl. No. 15/619,356, filed Jun. 9, 2017, Aaron Cockerill et al., Patented Case, Apr. 19, 2018.

Managing Access to Services Based on Fingerprint Matching, U.S. Appl. No. 16/241,504, filed Jan. 7, 2019, Aaron Cockerill et al., Patented Case, Sep. 30, 2020.

Configuring Access to a Network Services Based on a Security State of a Mobile Device, U.S. Appl. No. 17/307,332, filed May 4, 2021, Aaron Cockerill et al., Docketed New Case—Ready for Examination, Aug. 23, 2021.

Crawling Multiple Markets and Correlating, U.S. Appl. No. 13/484,132, filed May 30, 2012, Timothy Wyatt et al., Patented Case, Jun. 5, 2014.

\* cited by examiner

EVALUATING AUTHENTICITY OF APPLICATIONS BASED ON ASSESSING USER DEVICE CONTEXT FOR INCREASED SECURITY

CROSS-REFERENCE TO RELATED APPLICATIONS

The present application is a continuation application of U.S. Non-Provisional application Ser. No. 14/301,007, filed Jun. 10, 2014, entitled "MONITORING FOR FRAUDULENT OR HARMFUL BEHAVIOR IN APPLICATIONS BEING INSTALLED ON USER DEVICES", which is a continuation application of U.S. Non-Provisional application Ser. No. 14/105,950, filed Dec. 13, 2013, now U.S. Pat. No. 10,256,979, issued Apr. 9, 2019, entitled "ASSESSING APPLICATION AUTHENTICITY AND PERFORMING AN ACTION IN RESPONSE TO AN EVALUATION RESULT," the entire contents of which applications are hereby incorporated by reference as if fully set forth herein.

The present application is related to U.S. Non-Provisional application Ser. No. 14/253,702, filed Apr. 15, 2014, entitled "MONITORING INSTALLED APPLICATIONS ON USER DEVICES," the entire content of which application is hereby incorporated by reference as if fully set forth herein.

The present application is related to U.S. Non-Provisional application Ser. No. 14/253,739, filed Apr. 15, 2014, entitled "IDENTIFYING MANNER OF USAGE FOR SOFTWARE ASSETS IN APPLICATIONS ON USER DEVICES," the entire content of which application is hereby incorporated by reference as if fully set forth herein.

The present application is related to U.S. Non-Provisional application Ser. No. 13/786,210, filed Mar. 5, 2013, entitled "EXPRESSING INTENT TO CONTROL BEHAVIOR OF APPLICATION COMPONENTS," by Wyatt et al., U.S. Non-Provisional application Ser. No. 13/692,806, filed Dec. 3, 2012, entitled "COMPONENT ANALYSIS OF SOFTWARE APPLICATIONS ON COMPUTING DEVICES," by Wyatt et al., and U.S. Provisional application Ser. No. 61/655,822, filed Jun. 5, 2012, entitled "EXPRESSING INTENT TO CONTROL BEHAVIOR OF APPLICATION COMPONENTS," by Halliday et al., the entire contents of which applications are hereby incorporated by reference as if fully set forth herein.

FIELD OF THE TECHNOLOGY

At least some embodiments disclosed herein relate to evaluation/analysis of software in general, and more particularly, but not limited to assessing or evaluating the authenticity of an application or other software.

BACKGROUND

The Android system requires that all installed applications be digitally signed with a certificate whose private key is held by the application's developer. The Android system uses the certificate as a means of identifying the author of an application and establishing trust relationships between applications. The certificate does not need to be signed by a certificate authority. Rather, it is typical for Android applications to use self-signed certificates.

Android applications that are not signed will not be installed on an emulator or a device. When a developer is ready to release an application for end-users, the developer signs it with a suitable private key. The developer can use self-signed certificates to sign its applications. No certificate authority is needed.

The Android system tests a signer certificate's expiration date only at install time. If an application's signer certificate expires after the application is installed, the application will continue to function normally. The developer can use standard tools (e.g., Keytool and Jarsigner) to generate keys and sign its application .apk files.

The Android system will not install or run an application that is not signed appropriately. This applies wherever the Android system is run, whether on an actual device or on the emulator.

When a developer builds in release mode, it uses its own private key to sign the application. When the developer compiles the application in release mode, a build tools uses the developer's private key along with a Jarsigner utility to sign the application's .apk file. Because the certificate and private key used are owned by the developer, the developer provides the password for the keystore and key alias. Some aspects of application signing may affect how the developer approaches the development of its application, especially if the developer is planning to release multiple applications.

In general, the recommended strategy for all developers is to sign all of its applications with the same certificate, throughout the expected lifespan of its applications. As the developer releases updates to its application, the developer must continue to sign the updates with the same certificate or set of certificates, if the developer wants users to be able to upgrade seamlessly to the new version. When the system is installing an update to an application, it compares the certificate(s) in the new version with those in the existing version. If the certificates match exactly, including both the certificate data and order, then the system allows the update. If the developer signs the new version without using matching certificates, the developer must also assign a different package name to the application—in this case, the user installs the new version as a completely new application.

When the developer has an application package that is ready to be signed, the developer can sign it using the Jarsigner tool. To sign the application, the developer runs Jarsigner, referencing both the application's APK and the keystore containing the private key with which to sign the APK.

Maintaining the security of a private key is of critical importance, both to the developer and to the user. If the developer allows someone to use its key, or if the developer leaves its keystore and passwords in an unsecured location such that a third-party could find and use them, the developer's authoring identity and the trust of the user are compromised.

If a third party should manage to take a developer's key without its knowledge or permission, that person could sign and distribute applications that maliciously replace the developer's authentic applications or corrupt them. Such a person could also sign and distribute applications under the developer's identity that attack other applications or the system itself, or corrupt or steal user data. A developer's reputation depends on its securing its private key properly, at all times, until the key is expired.

SUMMARY OF THE DESCRIPTION

Systems and methods for assessing or evaluating the authenticity of an application or other software (e.g., a software application being newly-installed on a mobile device of a user, where the user desires to be notified if the application is determined to be fraudulent or a tampered version) are described herein. Some embodiments are summarized below.

In one embodiment, a method includes: evaluating, by a computing device, authenticity of a first application to provide a result, the evaluating using a plurality of inputs; and in response to the result, performing an action on the computing device.

In one embodiment, the evaluating comprises identifying a plurality of applications that are similar to the first application. The identified similar applications are then classified based on a respective signing identifier for each application. Based on this classification, applications that have a signing identifier of a developer are identified. Applications having a signing identifier that is different from the signing identifier of the developer are also identified.

The disclosure includes methods and apparatuses which perform the above methods and systems, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
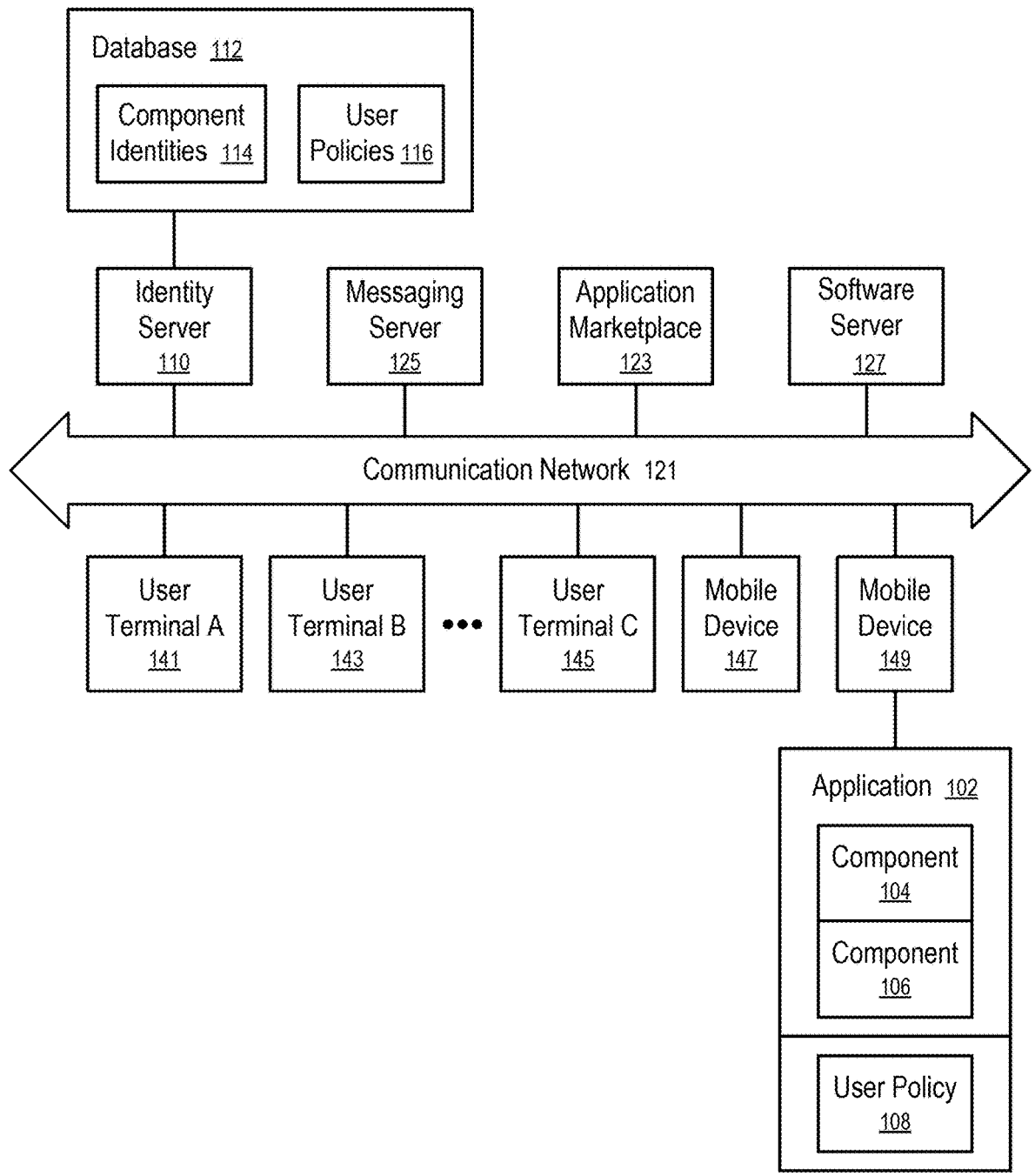
FIG. 1 shows a system (for control of behavior on computing devices or for analysis of software components) in which user terminals and mobile devices communicate with a messaging server and/or an application marketplace, or with an identity server, according to various embodiments.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, a "component" means a part of an application (e.g., an application that is installed by a user from an Android or other software application marketplace and then executes on a mobile device). In one example, a component is provided by the application's creator or by a third party. In another example, the component may be code provided by an ad network or an analytics network.

In yet another example, components are linked libraries/SDKs that are packaged within an application. This is code that is within the application, but the code is developed by a third party and provides the ability for an application developer to integrate certain behaviors of that component into its application (e.g., displaying a certain type of ads from a certain ad network such as LeadBolt).

In one embodiment, a component (e.g., a component associated with an ad network) may have multiple behaviors associated with it (e.g., notification display, settings changes, and/or information collection). For example, the behaviors of the BTController application (discussed further below) is the summation of the behaviors of its constituent components. In some cases, components may provide the ability to selectively opt-out of individual behaviors. However, in other cases, this is not possible, and in order to opt out of any set of behaviors, a user must opt-out of the entire component.

As described in more detail below, a user may express its intent as to how the user desires its computing device to behave. The intent may be explicitly provided by the user or may be otherwise determined (e.g., by reference to a database on a remote server). In one embodiment, the user's intent defines how the user wants to control receiving of certain types of messages (e.g., advertisements). The type of control desired by the user in its various forms of experience on a computing device (e.g., a mobile device) is expressed in the user's intent. This intent may be used to determine various behaviors of the computing device. For example, some undesired behaviors may be stopped by disabling various components of one or more applications that have been previously installed on the user's mobile device.

FIG. 1 shows a system (for control of behavior on computing devices or for analysis of software components, each as described herein) in which user terminals and mobile devices (examples of mobile devices include cell phones, smartphones, and tablet devices such as the iPhone device or an Android tablet), or other computing devices, communicate with a messaging server 125 and/or an application marketplace 123, or with an identity server 110, according to various embodiments as described below. In FIG. 1, the user terminals (e.g., 141, 143, . . . , 145) and/or mobile devices 147, 149 are used to access and/or communicate with identity server 110, application marketplace 123 (e.g., an Android or Google Play marketplace), and/or messaging server 125 (e.g., an email server) over a communication network 121 (e.g., the Internet, a wide area network, or other wired or wireless communications network).

Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, . . . , 145) and mobile devices 147, 149.

As an example, an owner of an Android phone (e.g., mobile device 147) may visit a web site hosted by marketplace 123 and select a free poker game application for remote installation on mobile device 147. The user may authenticate itself to marketplace 123 by its email address (e.g., Gmail address) and password.

The marketplace 123 and/or messaging server 125 are connected to respective data storage facilities to store applications, messaging account data for users, user preference data, and other data. In FIG. 1, messaging server 125 is connected to communication network 121 to deliver messages (e.g., email or text) to user terminals 141-145 or one of a user's mobile devices 147, 149.

In one embodiment, a software server 127 is coupled to communicate with application marketplace 123 and/or mobile devices 147, 149 by communication network 121. Server 127 stores, for example, an application (e.g., the Ad Network Detector discussed below) in memory, and sends the application to application marketplace 123 for later download and installation by a user onto, for example, mobile device 147. In another embodiment, software server 127 is a developer computer, or another computer, used to upload an application to marketplace 123.

In one embodiment, server 127 communicates with the application (now executing on mobile device 147 after installation by the user). The application is configured to identify at least one behavior on mobile device 147 as discussed herein. The at least one behavior is associated with each of a plurality of components of a plurality of other applications installed on the mobile device 147 (e.g., other applications previously downloaded by the user from the Google Play service), and the at least one behavior includes a first behavior associated with a first component.

Server 127 receives at least one behavioral preference of the user from mobile device 147, and the at least one behavioral preference is determined by the application based on input from the user (e.g., a user selection from a menu or results list). Server 127 stores the at least one behavioral preference (e.g., stores in a memory of server 127) for later uses such as responding to queries from other computing devices regarding the intent of the user of mobile device 147. In one embodiment, server 127 is independently maintained by each of many ad networks. The Ad Network Detector discussed herein may manage these behavioral preferences on behalf of a user for these networks.

In an alternative embodiment, identity server 110 includes a database 112, which stores component identities 114 and user policies 116. Mobile device 149 includes applications 102 that have been previously installed on mobile device 149. Applications 102 may be installed from application marketplace 123 or software server 127.

Applications 102 include components 104 and 106. The user policy 108 is stored locally in a memory of mobile device 149. During operation, as discussed in more detail below, user policy 108 may be used to define the handling of components 104 and 106 on mobile device 149.

A user policy for mobile device 149 may alternatively (or in addition to user policy 108) be stored as one of user policies 116 on identity server 110. User policy may be enforced on mobile device 149 using either a local user policy or a remote user policy, or a combination thereof.

As discussed in more detail below, after an application 102 is installed on mobile device 149, components 104 and 106 may be identified and behaviors exhibited on mobile device 149 may be attributed to one or more of components 104 and 106. Any given component (e.g., component 104) may be present in several different applications on mobile device 149 and/or may be common to numerous copies or versions of an application that have been installed on mobile or other computing devices for large numbers of other users. In one embodiment, this commonality of component presence permits observing and collecting structural and behavioral data associated with the component (e.g., how the component behaves on other mobile devices). This known component data may be stored in database 112, and the component data may be associated with a particular component identity 114. Thus, a data repository of prior component data can be used to compare to data more recently obtained for new components (such as those identified in newly-installed applications on mobile device 149).

More specifically, as characteristics and behaviors associated with components on mobile device 149 are identified and attributed, these characteristics and behaviors may be compared with known characteristics and behaviors stored either locally on mobile device 149 or stored remotely on identity server 110 as data associated with component identities 114. The results from such comparisons may be used for making decisions regarding configuration and/or disabling of one or more particular components on the mobile device or other computing device (e.g. user terminal 141), as discussed in greater detail below.

Although FIG. 1 illustrates an exemplary system implemented in client-server architecture, embodiments of the disclosure can be implemented in various alternative architectures. For example, the identity server 110 or application marketplace 123 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 2:
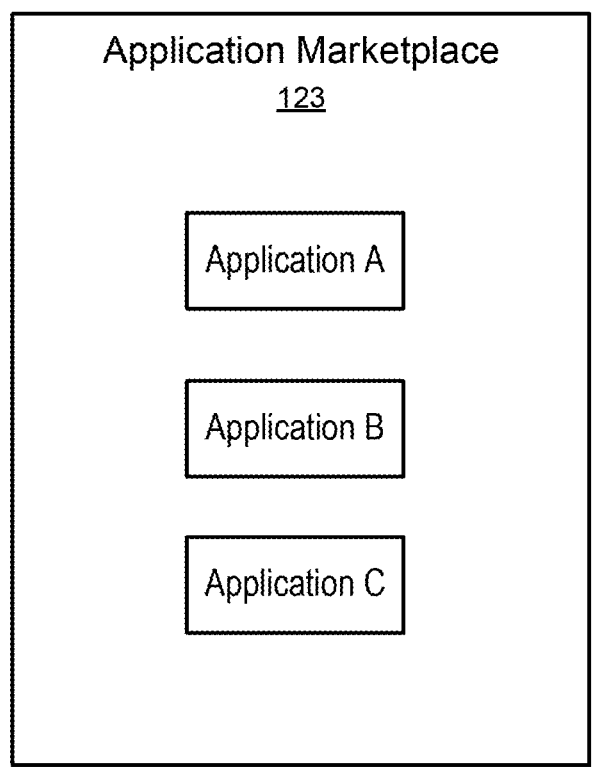
FIG. 2 shows an application marketplace offering multiple applications for remote installation on mobile devices, according to one embodiment.

FIG. 2 shows a web page of application marketplace 123 (e.g., the Google Play service) offering multiple applications (A, B, C) for remote installation on mobile devices, according to one embodiment. A user accesses the web page and selects an application for remote installation. The user may pay for the application on a web page provided by marketplace 123 (unless the application is free of charge).

For example, one of the applications available for download may be the application known as "BTController" as available on the Google Play service. Some user reviews (as posted on Google Play) for this application have included complaints about excessive advertisements on the user's mobile device after installation.

In one embodiment, an application referred to herein as "Ad Network Detector" may be downloaded from the Google Play service onto a user's mobile device 147. The expressing of user intent and control of behavior for mobile device 147 as described below may be incorporated into or otherwise work in conjunction with the Ad Network Detector application.

The Ad Network Detector application scans a user's phone or tablet for the presence of ad networks used in mobile apps, giving the user information about what types of ads can be displayed, and what information is gathered by the ad networks. With access to this information, the user is able to decide whether to keep the application that has a particular ad network on the user's phone.

Mobile device (e.g., smartphone or tablet) usage has increased dramatically, and some advertisers have begun to experiment with aggressive, new techniques to display ads on mobile devices. These techniques include pushing ads to the standard Android notification bar, dropping generically designed icons on the mobile desktop, and modifying browser settings like bookmarks or the default homepage. Because each of these techniques can display an advertisement outside the context of a specific application, it's difficult for users to know exactly which app is responsible for any given ad. The Ad Network Detector application provides a method for users to determine which ad network and application are the source for such ads.

Some ad networks also collect information that identifies a specific device or user for use in targeted marketing campaigns. Much like for browser-based ads, this practice allows users to see more personalized or relevant ads. It is sometimes difficult for a user to know what aspects of the user's information are collected by ad networks. The capabilities and information collection methods specific to each ad network may be determined from investigation. The Ad Network Detector application informs the user what data is being collected, and by which ad network/application.

In this embodiment, the Ad Network Detector application provides information to the user to about practices supporting mobile advertising. The application may detect many ad networks. Some of the ad networks detected may include the following examples:

LeadBolt
AdFonic
AdKnowledge
AdMob
BuzzCity
Casee
Everbadge
JumpTap

Regarding ad network capabilities and privacy, in this embodiment the capabilities and information collection methods specific to each ad network may be investigated. Based on this investigation, the Ad Network Detector application details what identifying information is collected by each ad network, and how it is collected. This may include personal information directly linkable to an individual user, such as an email address, and device and network information that is specific to an individual device or network, rather than to the user.

Figure 3:
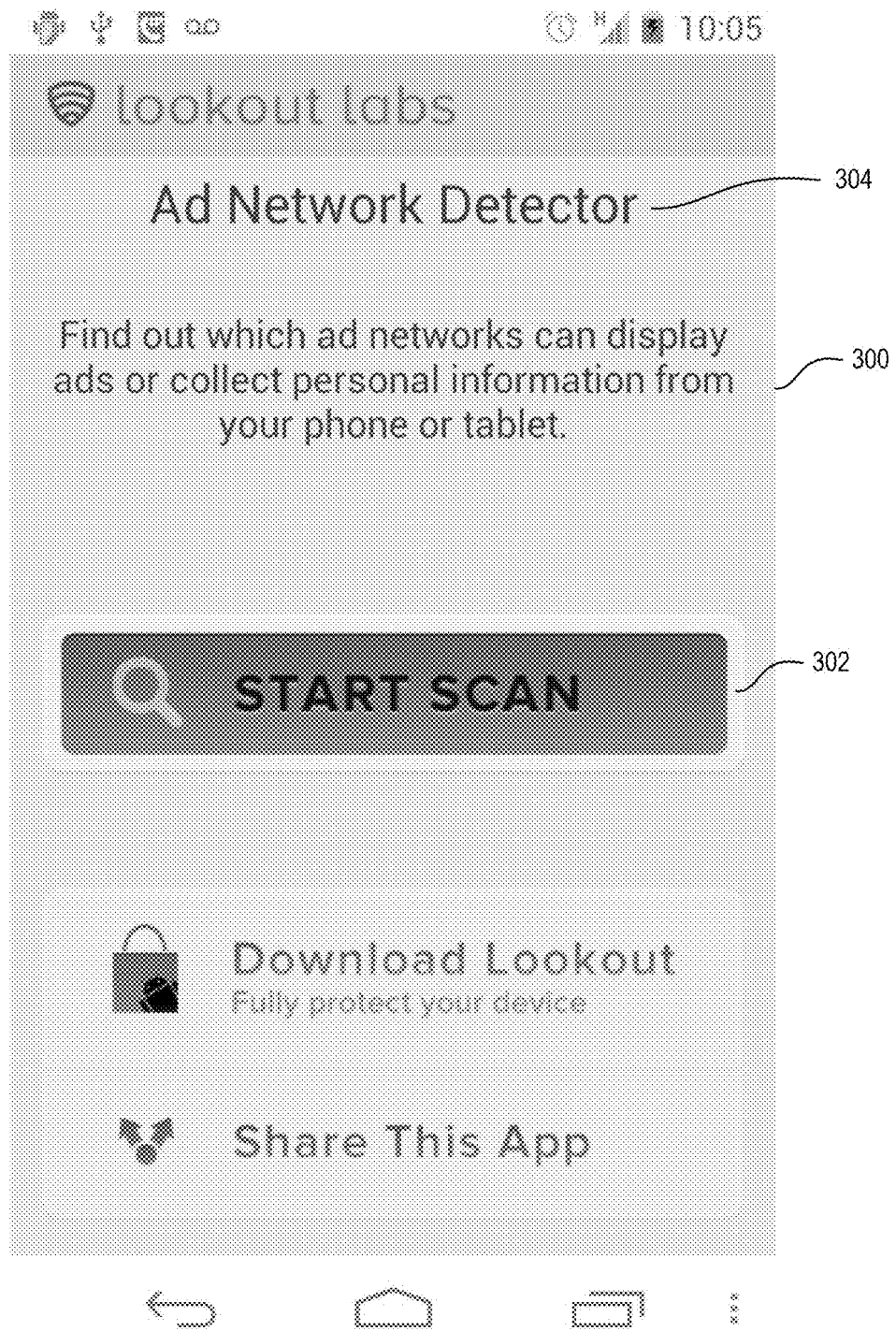
FIG. 3 shows a screen presented by an installed application to a user on a display of a mobile device, according to one embodiment.

FIG. 3 shows a screen 300 presented by an installed application 304 (e.g. the Ad Network Detector application after installation from application marketplace 123) to a user on a display of mobile device 147, according to one embodiment. In this embodiment, a user expresses his or her intent to control behavior of application components on mobile device 147.

In one example, a BTController application has previously been installed on the mobile device 147 by the user, among numerous other user-installed applications. The BTController includes an advertisement network component having several behaviors. A first behavior is the display of advertisements in the notification bar of mobile device 147.

In this embodiment, the components of each application (e.g., BTController) previously installed on mobile device 147 are determined (e.g., determined by application 304 or another tool installed on the mobile device for that purpose). For example, a scan to determine these components may be initiated by the user by her clicking on or touching a start scan button 302.

An example of a component to be identified is the LeadBolt advertising network included in the BTController application. In addition, at least one behavior (e.g., displaying of ads in the notification bar) associated with each of the components for an installed application is identified.

The identified behaviors are presented to the user (e.g., in a list of scan results). At least one behavioral preference expressing the intent of the user is determined (e.g., a desire of the user to opt out of a particular behavior). This intent is then implemented on the mobile device by reconfiguring the identified components of various applications on the mobile device as necessary to conform to the user's expressed intent.

Figure 4:
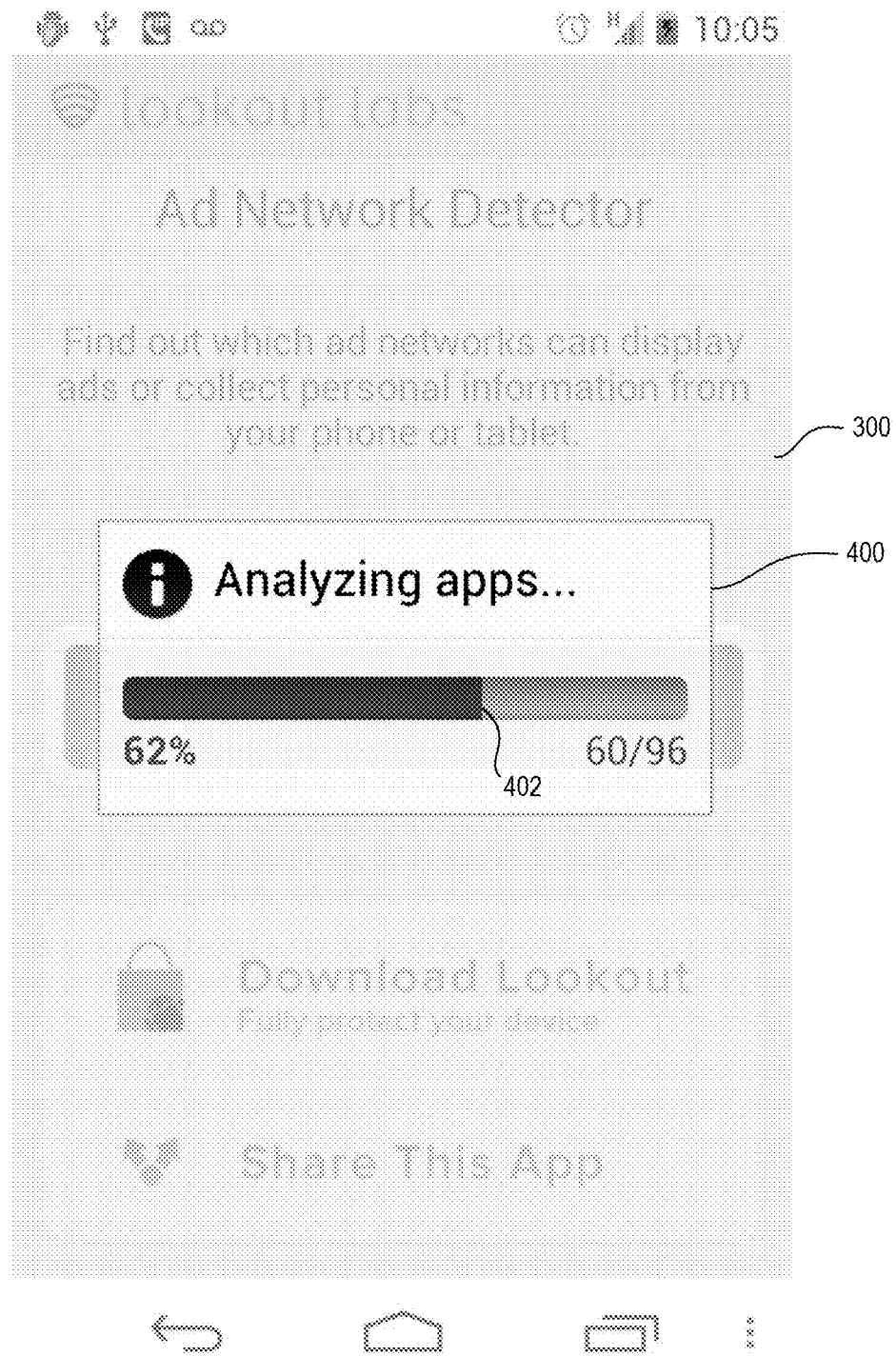
FIG. 4 shows a status display presented by the installed application of FIG. 3 that indicates the status of analyzing applications on the mobile device, according to one embodiment.

FIG. 4 shows a status display 400 presented to the user by the installed application 304 that indicates the status of analyzing applications on the mobile device 147 (i.e., applications other than application 304 that are installed on the mobile device) to identify their respective components, according to one embodiment. An extent of progress of the analysis or scan is indicated by bar 402.

Figure 5:
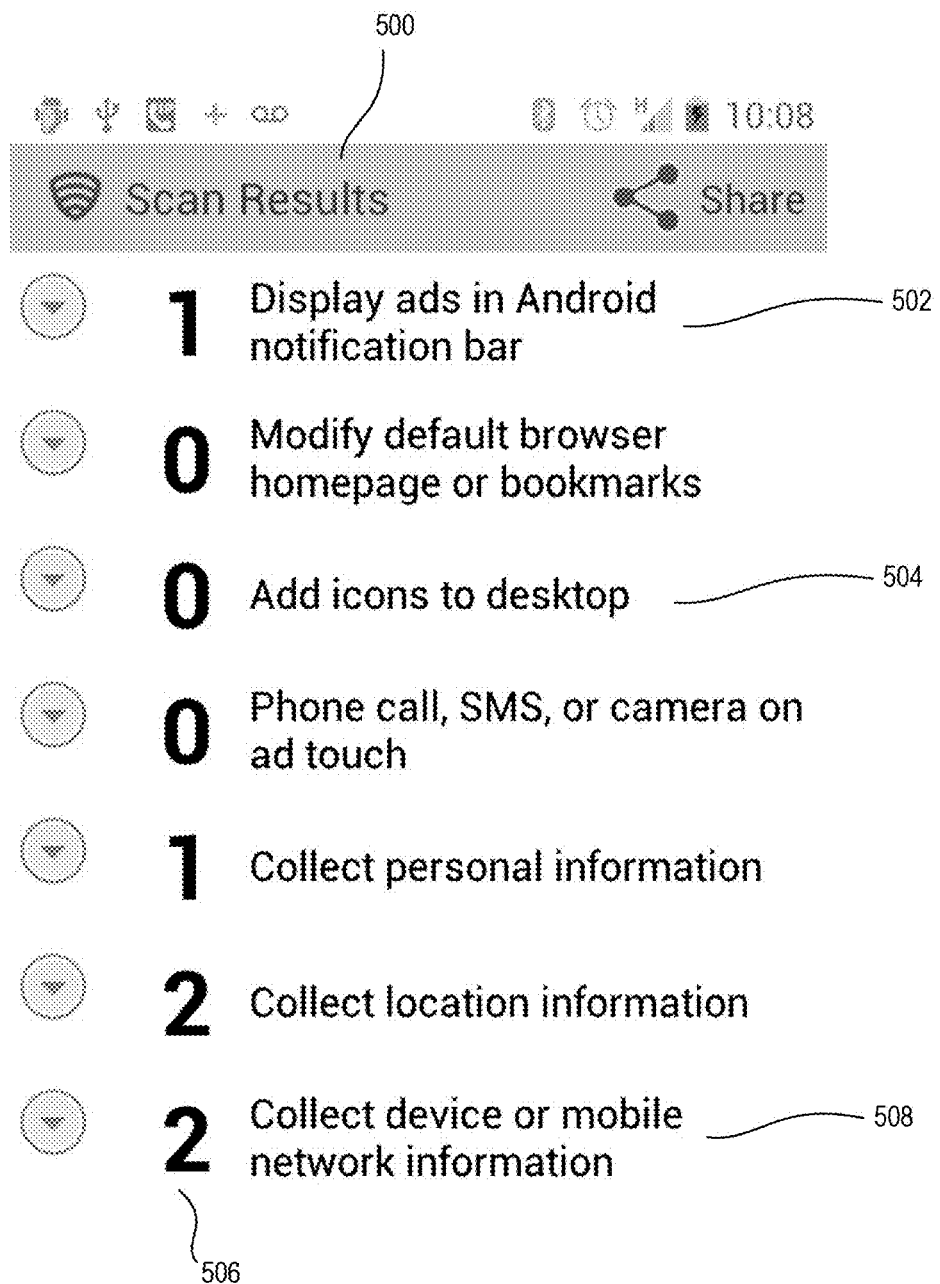
FIG. 5 shows a set of results presented to the user from the analyzing of the applications on the mobile device, according to one embodiment.

FIG. 5 shows a set of results 500 presented to the user from the analyzing of the applications on the mobile device 147, according to one embodiment. The results include a list of behaviors identified. For example, behavior 502 is the display of ads in the notification bar of the mobile device. The number of applications identified that include a component exhibiting the listed behavior is indicated in vertical arrangement or column 506. For example, only one application was identified that includes a component exhibiting behavior 502. Two applications were identified that include a component exhibiting behavior 508. In contrast, zero applications were identified including a component that exhibits behavior 504. It should be noted that the count, in this implementation, refers to the number of components that exhibit a particular behavior. This count (or an additional count) in other implementations could reflect the number of applications that exhibit the behavior. Any given component may be present in several different applications, so these two counts are not necessarily equal.

Figure 6:
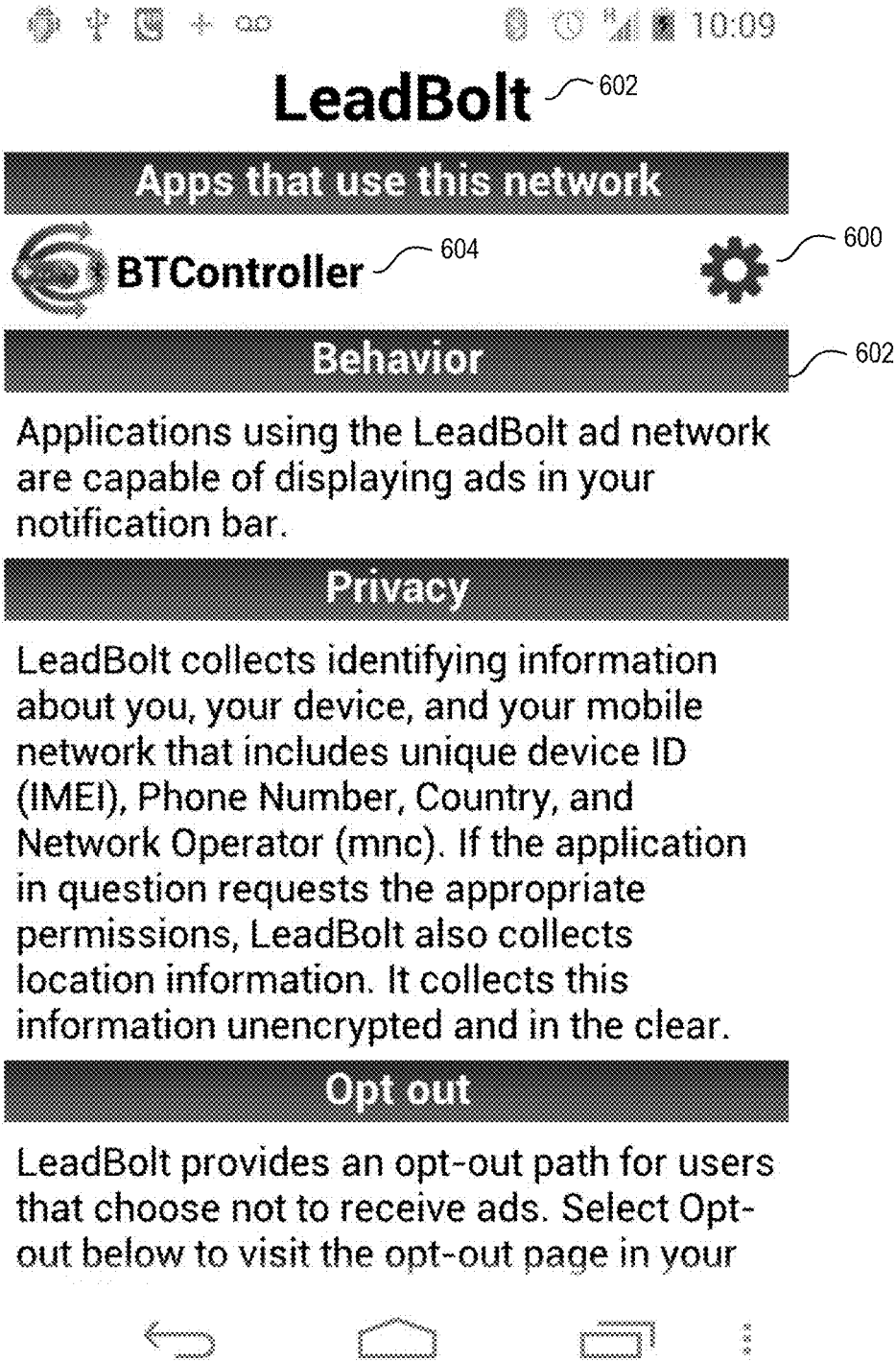
FIG. 6 shows a screen presenting information about an advertisement network incorporated in an application installed on the mobile device, according to one embodiment.

FIG. 6 shows a screen 600 presenting information about an advertisement network 602 (LeadBolt) incorporated in an application 604 (BTController) installed on mobile device 147, according to one embodiment. Screen 600 includes a description 606 of the behavior associated with application 604.

Figure 7:
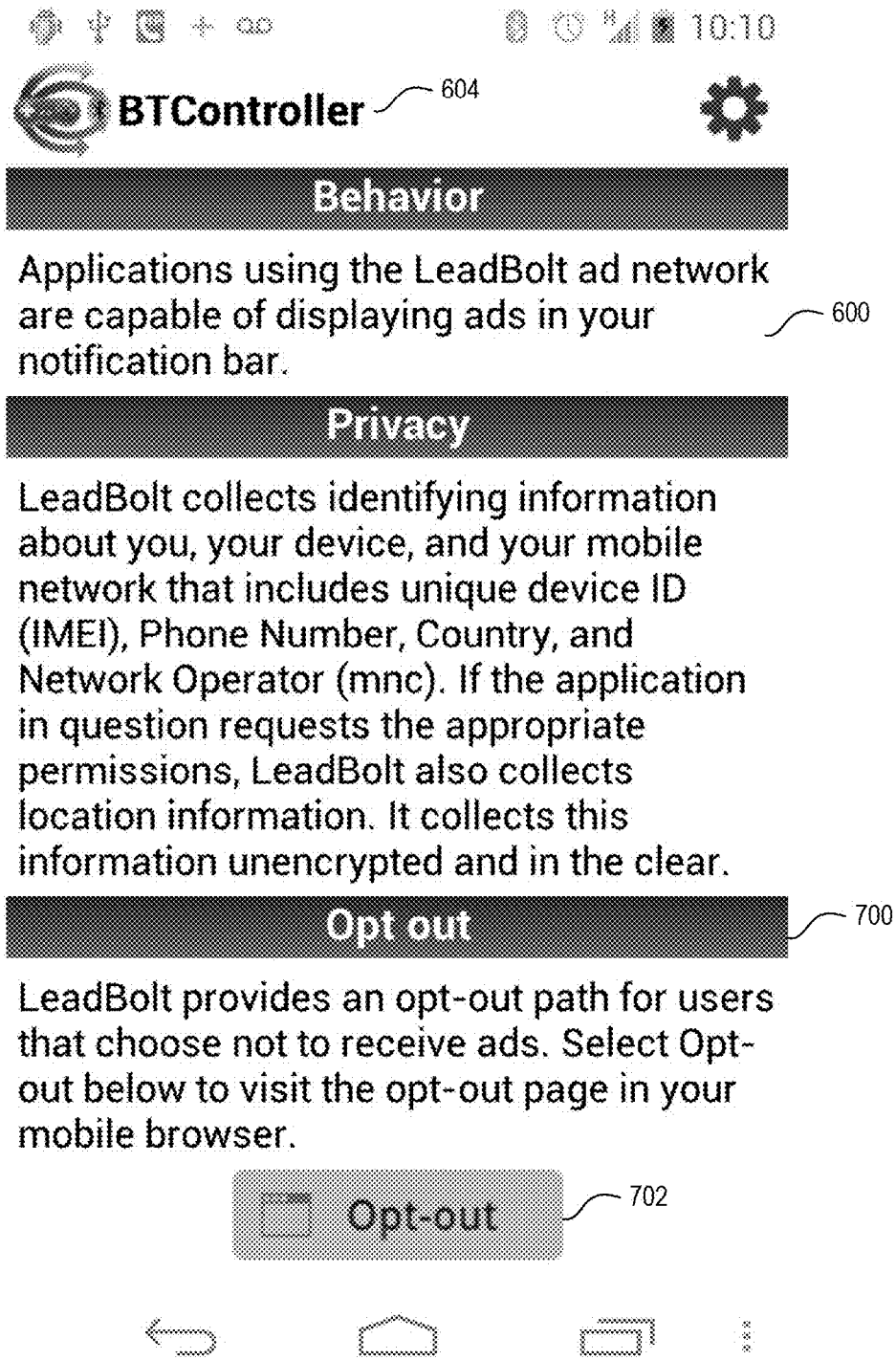
FIG. 7 shows a screen presenting an opt-out button for the user to opt out of the advertisement network, according to one embodiment.

FIG. 7 shows screen 600 presenting an opt-out button 702 for the user to opt out of advertisement network 602, according to one embodiment. Screen 600 includes a description 700 describing an opt-out option for advertisement network 602. The user expresses her intent by clicking on or touching (e.g., on a touch screen) opt-out button 702.

In one embodiment, the user's intent may be stored locally in a memory of mobile device 147. Alternatively, this intent may be stored remotely on a different computing device such as a server (e.g., software server 127 of FIG. 1, which may be a server operated by the software developer of the Ad Network Detector discussed above) accessible via communication network 121. This server may also be accessible by third-party application developers in order to conform behaviors to intents previously expressed by respective users. In another embodiment, this server is operated by the owner of the component.

Various other embodiments are now described below. In a first embodiment, a computer-readable storage medium stores computer-readable instructions (e.g., instructions of an Ad Network Detector), which when executed, cause a computing apparatus (e.g., a mobile device of a user) to, for an application installed on the mobile device of the user, determine components of the application; identify, via at least one processor of the mobile device, at least one behavior associated with each of the components, including a first behavior (e.g., ad display in a notification bar) associated with a first component; present results from the identifying to the user, the results to include a list of behaviors including the first behavior; and receive a selection from the user of at least one behavioral preference. Further information regarding determining the components of an application is discussed in greater detail below in the section titled "Analyzing Components of an Application".

In one embodiment, the at least one behavioral preference is selected from the group consisting of: opting out of the first behavior; opting out of one or more of the components including the first component; a set of user preferences for specifically-identified behaviors; and a policy. In one embodiment, the at least one behavioral preference is a policy, and the policy is enforced on new applications installed on the mobile device. In one embodiment, the first component enables the user to selectively opt out of individual behaviors of the first component.

In one embodiment, the selection from the user of at least one behavioral preference is to opt out of the first behavior, and the instructions further cause, after the opting out, running the first component to determine whether the first behavior is active. In one embodiment, the determining whether the first behavior is active comprises at least one activity selected from the group consisting of: running the first component in an emulated environment on a different computing device (e.g., software server 127); and monitoring behavior on the mobile device after receiving the selection from the user.

In one embodiment, the selection from the user of at least one behavioral preference is to opt out of the first behavior, and the instructions further cause, after the opting out, determining a status of the opting out using an application programming interface of the first component. In one embodiment, the instructions further cause the mobile device to, in response to the selection from the user, reconfigure execution of the first component so that the first behavior no longer occurs on the mobile device.

In one embodiment, the instructions further cause, in response to the selection from the user, uninstalling the application from the mobile computing device. In one embodiment, the instructions further cause, in response to the selection from the user, disabling further execution of the first component on the mobile device. In one embodiment, the first component is shared by the application and an additional application, and the disabling affects both the application and the additional application.

In one embodiment, the first behavior is a presentation of messages to the user. In one embodiment, the messages include at least one advertisement presented in a notification area of the mobile device. In one embodiment, the presentation of messages is outside of a context of the application presented to the user during normal operation of the application. In one embodiment, the first component is a part of the application.

In one embodiment, the instructions further cause displaying opt-out options to the user, wherein the opt-out options are solely for applications already installed on the mobile device. In one embodiment, the instructions further cause displaying opt-out options to the user, the opt-out options comprising all possible opt-out flows for the user on the mobile device as determined from a database. In one embodiment, the first component is a linked library packaged with the application prior to installation of the application on the mobile device.

In one embodiment, the mobile device is a tablet device. In one embodiment, the first component is a portion of the executable code of the application, and the executable code enables the application to interact with an advertising network or an analytics network. In one embodiment, interaction with the advertising network comprises display of advertisements provided from the advertising network.

In one embodiment, a non-transitory computer-readable storage medium stores computer-readable instructions, which when executed, cause a computing apparatus to: for an application installed on a computing device of a user, determine components of the application; identify, via at least one processor, at least one behavior associated with each of the components, including a first behavior associated with a first component; and determine at least one behavioral preference of the user.

In one embodiment, the instructions further cause storing the at least one behavioral preference on the computing device so that the application can locally determine the at least one behavioral preference. In one embodiment, the instructions further cause the first component to evaluate the at least on behavioral preference to determine how the first component is to behave on the computing device.

In one embodiment, the instructions further cause storing the at least one behavioral preference on a different computing device so that an advertisement network associated with the first component can query the different computing device (e.g., software server 127) in order to determine the at least one behavioral preference of the user. In one embodiment, the instructions further cause the first component to execute in conformance with results from the query of the different computing device, wherein the query includes a user identifier of the user.

In one embodiment, the instructions further cause: in response to downloading or installing the application, scanning the application to confirm compliance with the at least one behavioral preference of the user; and if the application violates the at least one behavioral preference, alerting the user of the violation or blocking installation of the application.

In one embodiment, a system comprises: a display; at least one processor; and memory storing instructions configured to instruct the at least one processor to: determine components of an installed application; identify at least one behavior associated with each of the components, including a first behavior associated with a first component; present, on the display, at least one component of the installed application for which a user can opt out; and receive a selection from the user of an opt-out for a first component of the at least one component.

In one embodiment, the instructions are further configured to instruct the at least one processor to present an opt-out status to the user for components for which the user has previously opted out.

In one embodiment, a method includes: for an application installed on a computing device of a user, determining components of the application; identifying, via at least one processor of the computing device, at least one behavior associated with each of the components, including a first behavior associated with a first component; presenting, on a display of the computing device, results from the identifying to the user, the results to include a list of behaviors including the first behavior; and receiving, via a user interface of the computing device, a selection from the user of at least one behavioral preference.

In one embodiment, a method includes: storing, in a memory (e.g., a memory of software server 127), a first application (e.g., the Ad Network Detector application) comprising computer-readable instructions, which when executed, cause a mobile device of a user to: determine components of a second application (e.g., BTController application 604) installed on the mobile device; identify at least one behavior associated with each of the components, including a first behavior associated with a first component (e.g., LeadBolt component 602); and determine at least one behavioral preference of the user; and sending, via at least one processor (e.g., microprocessor(s) of software server 127), over a communication network, the first application for storage in a data processing system (e.g., application marketplace 123) for subsequent installation from the data processing system onto the mobile device.

In one embodiment, the method further comprises communicating, via the at least one processor, with the first application after installation of the first application on the mobile device. In one embodiment, the data processing system comprises an application marketplace. In one embodiment, a network operator (e.g., Verizon or AT&T) controls the data processing system, and the mobile device is configured to operate with a cellular network operated by the network operator.

In one embodiment, a system (e.g., software server 127) comprises: at least one processor; and memory storing a first application, which when executed on a mobile device of a user, causes the mobile device to: determine components of a second application installed on the mobile device; identify at least one behavior associated with each of the components, including a first behavior associated with a first component; and determine at least one behavioral preference of the user; and the memory further storing instructions configured to instruct the at least one processor to send the first application to a data processing system (e.g., application marketplace 123) so that the first application can be later installed, over a communication network, on the mobile device from the data processing system.

In one embodiment, the instructions are further configured to instruct the at least one processor to communicate with the first application after installation of the first application on the mobile device.

In one embodiment, a method includes: communicating, via at least one processor (e.g., a processor of software server 127), with an application (e.g., the Ad Network Detector application) executing on a mobile device of a user, the application identifying at least one behavior on the mobile device, the at least one behavior associated with each of a plurality of components of a plurality of other applications installed on the mobile device, and the at least one behavior including a first behavior associated with a first component; receiving at least one behavioral preference of the user from the mobile device, the at least one behavioral preference determined by the application based on input from the user; and storing, in a memory (e.g., storing in a database distributed among multiple database servers), the at least one behavioral preference.

In one embodiment, the method further comprises storing the at least one behavior. In one embodiment, the method further comprises receiving a query from an advertisement network, associated with the first component, the query requesting the at least one behavioral preference of the user. In one embodiment, the method further comprises receiving, from the mobile device, an identification of the first component; and running, via the at least one processor, the first component in an emulated environment to determine whether the first behavior is active.

In one embodiment, the method further comprises receiving a query regarding the at least one behavioral preference in order to determine conformance of a new application with the at least one behavioral preference. In one embodiment, the method further comprises providing information in response to a request, received over a communication network, in order to evaluate the at least one behavioral preference and determine how the first component is to behave on the mobile device.

Additional exemplary, non-limiting details regarding various implementations of the above embodiments are now described here below. In one example, a user may opt-out of specific components (e.g., as determined using the approaches described herein). The user is presented a list of components that the user can opt out of. The user may perform opt-out actions, or these may be done automatically upon user request or selection. Then, the user may see (e.g., on a display of a mobile device) a status indication that the user has opted out of identified components.

In one embodiment, there are various types of opt-out options. For example, a user may opt-out entirely of a component, opt-out of particular behaviors of a component, opt-in entirely to a component, opt-in to particular behaviors of a component, purge some or all data collected by a component, reset an identifier used to identify the user or device to a component, or otherwise modify the component's behavior on the device or the data transferred to or from the component on the device.

In one embodiment, opt-out options may be displayed to a user (e.g., on a display of a mobile device) using various approaches. In a first approach, this is done by detecting which components are present in installed applications on a mobile device, and then only displaying opt-out flows for the applications are installed on the mobile device. In a second approach, input is received from a user as to which behaviors the user wishes to opt out of. In a third approach, all possible opt-out flows, as determined from a database, are presented to the user.

In one embodiment, a status for opt-out may be determined in various ways. A first way uses an API provided by the vendor or developer of the component to determine the opt-out status. A second way determines whether behavior is still active by running the corresponding component (e.g., in an emulated environment on a server or by monitoring behavior on the user's mobile device).

In one embodiment, a user declares preferences for specific behaviors desired on the user's mobile device. The components themselves evaluate these declared preferences in order to determine how the components should behave on the user's mobile device.

For example, the user may set its preferences, and then these preferences are stored locally or on a remote server (e.g., software server 127). A component queries these preferences (e.g., by sending a query) in order to determine how the component should behave (or is required to behave by the mobile device or another computing device).

In one embodiment, various types of preferences that can be set by the user relate to the following: location collection for targeted ads, notifications in a notification area of the user's device, planting of bookmarks or icons on a device, and app tracking used to deliver targeted ads (e.g., related to determining what apps a user has installed).

In one embodiment, various methods may be used for storing the users preferences. In a first approach, local service on a device is used, whereby applications can query to determine what preferences a user has set.

In a second approach, a server-side service permits ad networks to query a user's preferences based on a user identifier (e.g., phone number, IMEI, Android ID, Apple UDID, or hashed/salted-hashed versions of them).

In another embodiment, preferences are declared for which behaviors a user desires. Automatic scanning or alerting is performed when an application that violates these preferences is downloaded or installed.

For example, upon installation, the mobile device detects which components are in an application, and determines the behaviors that are associated with components of the application. If any of these behaviors are disallowed, or require an alert, the mobile device may either block the application from installing (or notify the user to uninstall the application), or may alert the user that the application contains a disallowed behavior in one of its components.

Now discussing additional non-limiting examples, there are various mechanisms that a user can use to express his or her intent. One example is an affirmative opt-in or opt-out for specific behaviors. For example, a user may say she does not want a specific component to track her location, or she does not want Google analytics to know certain information about her. Another might be that the user sets a preference indicating the desire that the user does not want any third party components to have access to or view the user's location data.

In another example, an application policy may be implemented. For any app that has a component that performs an unidentified behavior, the Ad Network Detector will block the app from being installed on the user's phone or other device. These are behavior-based preferences that are manifested in the blockage of installation for any applications that may contain components that express such behaviors.

In one example, when an application is running on a user's phone, it should ask a preference service or a preference store (e.g., implemented on software server 127) what the preference is for the user and then respect that preference during execution. Information about user preferences for many users may be made available in a single online location so that a component can query and respect the preferences.

Regarding determining the components that are present in an application, the application can be identified and broken into components. After identification, there are various techniques that may be used to determine the behavior of those identified components. In some cases, structural comparisons of the call graphs of components in an application may be examined (e.g., determining which component is talking to the operating system of the mobile device, and which aspects of the operating system are involved). Other forms of static analysis may also be used that involve looking at the code inside of a component. By looking at the code, it can be determined whether the component can obtain a user's location, for example, or perform other functions. In one example, a knowledge base may be maintained that includes a list of components that are commonly distributed online and the corresponding behaviors of those components.

Also, dynamic analysis may be used, which is essentially running the application component in an emulated environment or on an actual device and detecting what is occurring (e.g., what services the component connects to or communicates with) on a user device to determine whether a component has a particular behavior. Additional details regarding determination of components and component attribution are provided in the section below titled "Analyzing Components of an Application".

In one example, the user may be presented with a screen that shows the applications installed on the user's device or the behaviors on the device (or even the full set of all behaviors that are possible on the device, even outside of the apps that the user has already installed on the device) and what applications/components the behaviors are attributed to.

In one example, a user can opt out of specific components. The user may be shown what components are on already her phone, or the user can say she does not want a certain type of behavior, and the Ad Network Detector only shows the user the specific network opt-outs that involve that behavior.

In another example, the user has expressed her preferences regarding behavior. An online preference service stores these preferences, and components are required to query the service prior to installation on a mobile device of the user. The service may be implemented on the mobile device, or on a separate server.

Additional information regarding various non-limiting examples of mobile devices and their usage more generally, including the presenting of information regarding a mobile device to a user, is described in U.S. Pat. No. 8,538,815, issued Sep. 17, 2013, entitled "SYSTEM AND METHOD FOR MOBILE DEVICE REPLACEMENT," by Mahaffey et al.; U.S. patent application Ser. No. 13/960,585, filed Aug. 6, 2013 (which is a continuation of U.S. Pat. No. 8,538,815), and is entitled "SYSTEM AND METHOD FOR PROVIDING OFFERS FOR MOBILE DEVICES"; and U.S. patent application Ser. No. 14/098,473, filed Dec. 5, 2013 (which is a continuation of U.S. patent application Ser. No. 13/960,585), and is entitled "SYSTEM AND METHOD FOR GENERATING EFFECTIVE OFFERS TO REPLACE MOBILE DEVICES," the entire contents of which applications are incorporated by reference as if fully set forth herein.

Figure 8:
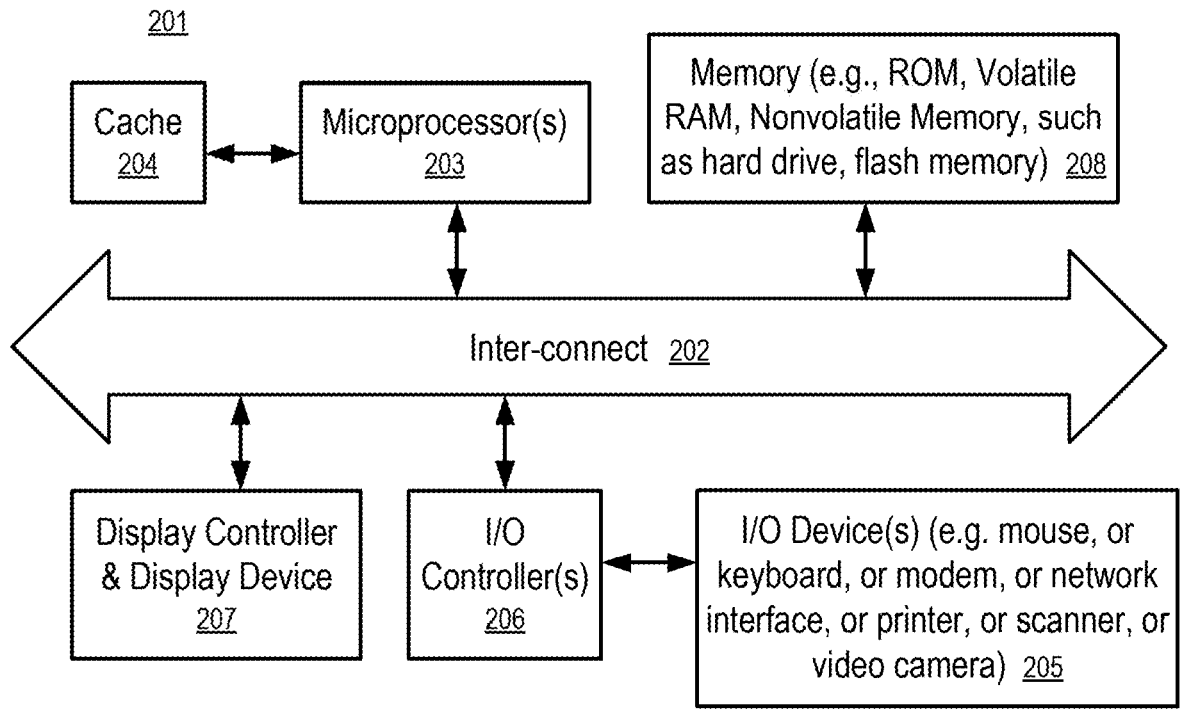
FIG. 8 shows a block diagram of a data processing system (e.g., a messaging server or an application server) which can be used in various embodiments.

FIG. 8 shows a block diagram of a data processing system (e.g., an identity server 110, a messaging server 125, application marketplace 123, or software server 127) which can be used in various embodiments. While FIG. 8 illustrates various components of a computer system, it is not intended to represent any particular architecture or manner of interconnecting the components. Other systems that have fewer or more components may also be used.

In FIG. 8, the system 201 includes an inter-connect 202 (e.g., bus and system core logic), which interconnects a microprocessor(s) 203 and memory 208. The microprocessor 203 is coupled to cache memory 204 in the example of FIG. 8.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 8 is used to implement application marketplace 123, messaging server 125, and/or other servers.

In another embodiment, a data processing system as illustrated in FIG. 8 is used to implement a user terminal, a mobile device, or another computing device on which an application is installed. A user terminal may be in the form, for example, of a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 9:
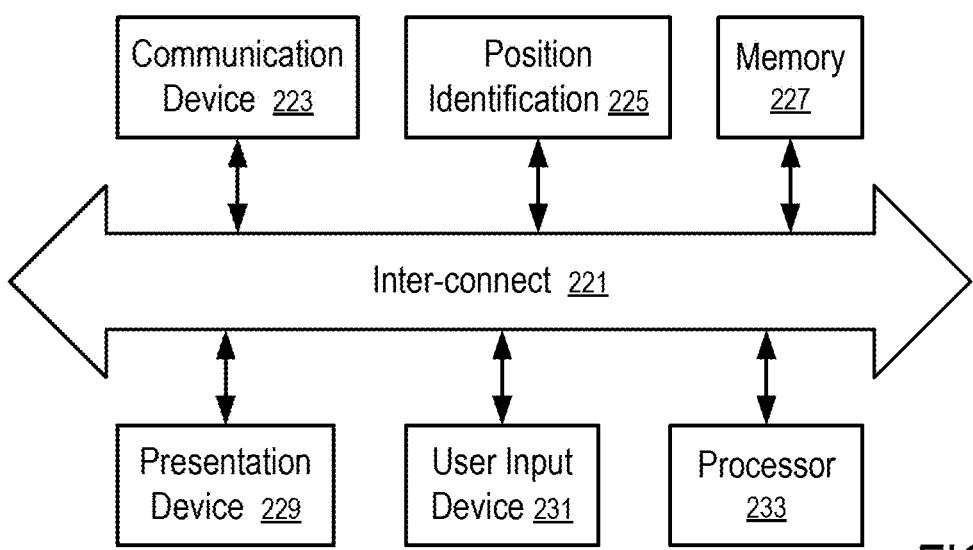
FIG. 9 shows a block diagram of a user device (e.g., a mobile device), according to one embodiment.

FIG. 9 shows a block diagram of a user device (e.g., a mobile device or user terminal) according to one embodiment. In FIG. 9, the user device includes an interconnect 221 connecting the presentation device 229, user input device 231, a processor 233, a memory 227, a position identification unit 225 and a communication device 223.

In FIG. 9, the position identification unit 225 is used to identify a geographic location. The position identification unit 225 may include a satellite positioning system receiver, such as a Global Positioning System (GPS) receiver, to automatically identify the current position of the user device.

In FIG. 9, the communication device 223 is configured to communicate with a network server to provide data, including location data. In one embodiment, the user input device 231 is configured to receive or generate user data or content. The user input device 231 may include a text input device, a still image camera, a video camera, and/or a sound recorder, etc.

Analyzing Components of an Application

Various additional embodiments related to component analysis and attribution (e.g., identifying and determining components of an application) are now set forth below. The embodiments below do not limit the generality of any embodiments in the foregoing description.

In one embodiment, an application is a mobile application, which contains one or more components (e.g., a library, ad network or analytics software development kit (SDK), or other set of code designed to work together). A component identity (e.g., component identity 114) is information about a component. Examples of component identities include the following: a category (e.g. ad network, analytics, and malware SDK), authorship (e.g. Acme, Inc., John Smith), name of a component (e.g. "AdMob"), a range of versions or all versions of a component (e.g. AdMob 6.x, AdMob, zlib), and a particular version of a component (e.g. zlib 1.2.7, AdMob SDK 6.0.1). The data associated with a given component may be stored in database 112.

In one embodiment, a component's behavior is generally that behavior existing or occurring (e.g., functions performed) when a component is functioning on a computing device (e.g., functioning in an application 102 running on mobile device 149). One example of a behavior is the sending of certain types of data to a server (e.g., sending browser history to a server at www1.adcompany.com, or sending a location to a server at tracking.analyticscompany.net). Other examples include the following: accessing data on a computing device (e.g., contacts, call history); and performing certain functions on a device (e.g., changing brightness of a screen, sending a text message, making a phone call, pushing advertisements into a notification bar).

In one embodiment, a component's structure is how a component is implemented in code. This structure may include a code package and/or a code module structure. Also, a component's structure may include characteristics of the executable code of the component, such as for example, cross-references in a control flow/call graph, references to static data, and machine instructions used.

Various further embodiments related to component analysis are now described below. In a first embodiment, a non-transitory computer-readable storage medium stores computer-readable instructions, which when executed, cause a computing system to: for an application (e.g., one of applications 102) installed on a computing device (e.g., mobile device 149) of a user, determine components (e.g., components 104 and 106) of the application; and identify, via at least one processor, at least one behavior (e.g., sending device location to an ad server) associated with each of the components, including a first behavior associated with a first component. The instructions may cause the computing system to present, on a user display of the computing device, an identification of the components. The instructions may cause the computing system to determine at least one behavioral preference of the user.

In one embodiment, the instructions cause the computing system to store a user policy (e.g., user policy 108 or one of user policies 116) based at least in part on the at least one behavioral preference (e.g., user intents expressed by the user on a mobile device), and to enforce the user policy on new applications installed on the computing device.

In one embodiment, the instructions cause the first component to execute in conformance with results from a query of an identity server (e.g., identity server 110 or another computing device). The instructions may cause the computing system to, in response to installing the application, scan the application to confirm compliance with a user policy of the user, where the user policy stored on an identity server. In one embodiment, the instructions may cause the computing system to enforce, based on identified behaviors associated with the components, a user policy for each of the components.

The instructions may cause the computing system to compare permissible behaviors in the user policy for the components with the identified behaviors. In one example, the comparing of the permissible behaviors comprises determining behaviors, observed for the components on other computing devices, from a data repository (e.g., database 112). The instructions may cause the computing device to, in response to the determining the behaviors from the data repository, configure or disable execution of one or more of the components on the computing device.

In one embodiment, a system includes: a data repository (e.g., database 112) storing component data for known components, the component data including data for a first known component; at least one processor; and memory storing instructions, which when executed on a computing apparatus, cause the computing apparatus to: for a new component in a first application for a computing device of a user, perform a comparison of the new component to the component data; and based on the comparison, make a determination that the new component corresponds to the first known component.

In one embodiment, the instructions further cause the computing apparatus to, in response to the determination, perform at least one of: comparing a first known behavior of the first known component to a user policy of the user; and comparing an observed behavior of the new component to the user policy. In one embodiment, the component data includes component identities (e.g., component identities 114), each component identity corresponding to respective identifying information for a known component. In one embodiment, the determination is made prior to installing the new component on the computing device.

In one embodiment, the instructions further cause the computing apparatus to associate a similarity value (e.g., a value within an arbitrary range of zero to one) with the comparison, and wherein the determination is made in response to the similarity value being greater than a threshold value. In alternative embodiments other forms of comparison of the similarity value to a threshold may be done (e.g., where the similarity value is lower than the threshold). In one embodiment, the comparison is based at least in part on a structure of the new component, the structure selected from the group consisting of a packaging structure, a module structure, and an executable code structure.

In one embodiment, the component data includes known structural characteristics and known behavioral characteristics. In one embodiment, the performing the comparison comprises comparing the known structural characteristics and the known behavioral characteristics to identified characteristics of the new component.

In one embodiment, the instructions further cause the computing apparatus to generate a notification when the identified characteristics are determined to differ from at least one of the known structural characteristics and the known behavioral characteristics. In one embodiment, the generating the notification comprises sending an alert to the computing device.

In one embodiment, a method includes: storing, in memory, component data for known components, the component data including data for a first known component; for a new component in a first application for a computing device of a user, perform, via at least one processor, a comparison of the new component to the component data; and based on the comparison, make a determination that the new component corresponds to the first known component.

In one embodiment, the new component is selected from the group consisting of code from the first application, and a library in the first application. In one embodiment, each of a plurality of different applications includes the new component, the new component corresponds to a set of behaviors when executed on a computing device, and the component data comprises behavioral data including the set of behaviors.

In one embodiment, the method further comprises associating the set of behaviors with the new component. In one embodiment, each of a plurality of computing devices has been observed when running a respective one of the different applications, and each of the plurality of computing devices exhibits the set of behaviors. In one embodiment, the determination is based in part on a context of operation of the new component on the computing device.

In one embodiment, the context is an accessing, during execution of the first application, of location information while the first application has a visible presence to a user (e.g., the first application is presenting location information to the user on a user display), and the set of behaviors includes determining a location of the computing device. In one embodiment, the component data includes a plurality of contexts each associated with at least one acceptable behavior. In one embodiment, the component data includes risk scores for known components, and the method further comprises providing a risk score in response to a query regarding an application installed or to be installed on the computing device of the user.

In one embodiment, a method comprises: storing, in memory, a first application comprising computer-readable instructions, which when executed, cause a mobile device of a user to: for a new component of a second application installed on the mobile device, perform a comparison of the new component to component data for known components, the component data including data for a first known component; and based on the comparison, make a determination that the new component corresponds to the first known component; and sending, via at least one processor, over a communication network, the first application for storage in a data processing system for subsequent installation from the data processing system onto the mobile device.

In one embodiment, a system includes: at least one processor; and memory storing a first application, which when executed on a mobile device of a user, causes the mobile device to: for a new component of a second application installed on the mobile device, perform a comparison of the new component to component data for known components, the component data including data for a first known component; and based on the comparison, make a determination that the new component corresponds to the first known component; and the memory further storing instructions configured to instruct the at least one processor to send the first application to a data processing system so that the first application can be later installed, over a communication network, on the mobile device from the data processing system.

Now discussing a component analysis process for one particular embodiment, a new application may be decomposed into identifiable components. An identity of each component may be displayed to the user. Behavioral and/or structural characteristics attributable to each component identity may be identified. The behavior for a given component may be displayed to the user.

A user policy (e.g., user policy 108) based on component behavior may be enforced on the user's computing device. For example, the user policy may require that there be no applications that send location to an advertising network. In another example, the user policy may require that no applications send identifiers to an advertising network.

Behavioral and/or structural characteristics of a component present in the new application may be identified. This may be, for example, an application 102 that has been installed on mobile device 149.

A comparison is made between the characteristics attributable to the component identity and the characteristics that have been identified in the new application. In one embodiment, if the identified characteristics are different from the characteristics attributable to the component identity, then an alert is generated to indicate that the behavior of the component has changed. The characteristics attributable to the component identity may be stored in database 112 of identity server 110 and may be accessed when making this comparison. For example, these attributable characteristics may be stored as component data associated with respective component identities 114 (i.e., known data regarding component behavior or other characteristics of a component may be stored for each component identity 114).

Now, further detail regarding how component analysis is performed is described below. As mentioned above, an application is decomposed into identifiable components. In particular, a data repository stores a set of component identities in a database.

Each component identity has identifying information for a given component that, if present in an application, indicates that the given component is present in the application. Examples of identifying information include the following: a package name prefix for a set of one or more classes, a class name, or a code fingerprint of a code block, method, class, package, etc.

When used, fingerprinting can be performed in a variety of ways. A first way is the creating of an abstract representation of an instruction set. Another way is to, from an abstract representation, create a set of n-gram indices that can create a fingerprint identifier for a set of code (e.g., a hash of indices) or that can be compared to another set of indices to perform a fuzzy match. In yet another way, asset or resource fingerprinting may be used. As a final way, fingerprinting may be done by analyzing the network traffic generated by an application on a device or in a dynamic analysis system. Server communication, network traffic destined to a server, may be used to associate a component with a particular network service. Some examples of network traffic include traffic to server with name server1.somewhere.com, traffic to server with IP 8.8.8.8 or 2001:4860:4860::8888, HTTP request with header "User-Agent: MyHttpLibrary-1.1", HTTP request with a particular URI or URI pattern, and traffic that matches a SNORT or YARA rule.

Analysis of a new application can be used to determine if identifying information for a given component identity matches the new application. If it matches, then the given component is present in the new application. This analysis can be done at the client (e.g., mobile device 149), the server (e.g., identity server 110), or using a combination thereof.

In one embodiment, the analysis is done at one computing device (e.g., either on the client or the server). The database of identifying information is stored locally on the computing device. The new application is also present locally (e.g., the new application itself has been previously sent to identity server 110 from mobile device 149, or from application marketplace or software server 127 prior to installation on mobile device 149).

In this embodiment, there are multiple options for analysis. In a first option, for each item of identifying information in the database, the new application is searched to determine if the identifying information matches the new application. Alternatively, information can be extracted from the new application, and then a check or comparison done to see if that information matches any of the identifying information stored in the database.

In another embodiment, a client computing device submits information to a server to determine components that are present in an application. The database of component identifying information (known component data) is stored on the server. The application is present on the client. The client extracts information (e.g., component identifying information) from the application, and then sends this extracted information to the server.

The server checks to see if the extracted information matches any of the identifying information in the database (e.g., the extracted information may be received as a query from mobile device 149). If so, the server sends back information about component identities to the client (e.g., the server sends results from the query to mobile device 149).

In a different embodiment, the client computing device submits an identifier for the new application to the server. This identifier may be, for example, a hash of the application binary code, a package name, a title of the application, or another form of application identifier. The server stores data regarding previously-analyzed applications. This data includes a list of components for each of the previously-analyzed applications. In yet other embodiments, the application information is gathered from an application store or marketplace, or from another device different from the client computing device (e.g., where the application is not installed on a client computing device, but is stored within an application store for downloading and installation, or is being staged for placement into an application store). Information from or about the application may be gathered from the application store or marketplace, or such other device. U.S. Publication No. 2012/0240236, filed Aug. 25, 2010, entitled "Crawling Multiple Markets and Correlating," is incorporated by reference as if fully set forth herein. U.S. Publication No. 2012/0240236 is a continuation-in-part of U.S. Pat. No. 8,533,844, entitled "System and Method for Security Data Collection and Analysis."

The server uses the identifier received from the client and compares this identifier to the data regarding previously-analyzed applications. If there is a match between the identifier and a previously-analyzed application, then the components for that matched application (obtained from the stored list of components above) are determined to be in the new application (and this result may be sent to the client device). This matching to the database may be done similarly as was described earlier above for the component analysis on a single device. The server sends information about these identified component identities back to the client.

After a component has been identified as being present in an application, the identity of the component may be displayed to the user. For example, identification and display of components present in an application may be done similarly as was described above for the Ad Network Detector. Behavioral and/or structural characteristics that are attributable to a given component as stored in the database for various component identities may be sent from the server to the client device for those components that have been identified as being present in an application.

In one embodiment, there are various ways to identify characteristics that are actually present in a component of an application. For example, U.S. Pat. No. 8,533,844, issued Sep. 10, 2013, and entitled "System and Method for Security Data Collection and Analysis", by Mahaffey et al.; and U.S. patent application Ser. No. 13/958,434, filed Aug. 2, 2013, entitled "ASSESSING A DATA OBJECT BASED ON APPLICATION DATA ASSOCIATED WITH THE DATA OBJECT," which applications are incorporated by reference as if fully set forth herein, provide a general discussion about the gathering of information from an application on a mobile device for further processing at a server. According to this embodiment, information that has been gathered as described by Mahaffey et al. in U.S. Pat. No. 8,533,844 is then used for component analysis at identity server 110 in order to identify characteristics of a component.

In another embodiment, behavioral characteristics may be determined or collected using other approaches. For example, behavior may be determined based on network traffic (e.g., SMS, IP) data, or based on the code source of a given behavior (e.g., a class name or a package name responsible for geo-locating, or a fingerprint of a code segment responsible for sending SMS traffic).

In one embodiment, component identity-attributable characteristics are compared to actually-present characteristics (e.g., as gathered for a new application just installed on a mobile device). For example, if behavior is part of the known data for a component identity, and a new application's component behavior matches this known behavior, then it is assumed that information about the component identity (e.g., in database 112) applies to the new application. Information about the component identity may include, for example, a text description, risk scoring, and data whether an application is malware or is not malware. For example, this information may be provided as a result or response to a query from a mobile device.

If the actual behavior and the known behavior for the component identity are different, this may indicate that the component in the new application is a newer version or a tampered-version, and that the component needs to be reviewed again in order to update the database. Also, an alert may be generated based on the component information determined above. For example, an email may be sent to an analyst to do further analysis of a component, or an entry may be created in a work queue regarding further component analysis to be done.

In various other embodiments, the results from component identification for applications on a device are presented to the user. The user may provide input in a user interface to define or update a user policy based on this component identification. For example, the user may opt-out of an identified component.

In another embodiment, a component review process is provided for reviewing potentially undesirable code at scale (where manual review is not practical). The component analysis as described above is automated so that a human is not required to do component analysis manually. Characterizing components that have been previously reviewed (e.g., stored as data for a component identity with a risk score) and determining when that component has changed behavior (i.e., the actual behavior is different from the known behavior stored in the component identity) can create an automated process where humans only need to re-review component code when its behavior has changed. A behavior change may also be associated with a code fingerprint having changed slightly (e.g., if doing a fuzzy match, there is a threshold for which it is considered that there is no change, and another threshold for which it is considered that that there is a match, but that there is a sufficient change in behavior). In various embodiments a comparison to a threshold may be done to see if a value is lower or greater than the threshold (which may include the cases of equal to or lower, or equal to or higher than the threshold). Similarly, other characteristics disclosed can be used to determine if the component in the new application exactly matches the known component or if it partially matches in a way that merits re-analysis.

Yet another embodiment relates to behavioral risk analysis of applications. In this embodiment, the component analysis involves separating identified components that have already been reviewed (i.e., components that have known component data stored in database 112), and that are common across numerous different applications (or across copies of the same application) as installed on many user devices, from components that are unique (e.g., an associated behavior has not been observed before) to a particular new application (e.g., behavior unique to a single, most-recent installation on mobile device 149). These unique behaviors are specifically audited within the context of the new application (e.g., application 102).

As an example of context, it is common for ad networks to ask for location data. This is a well-accepted behavior. If a user is looking, for example, at a game like Angry Birds, an application that asks for a location may be exhibiting acceptable behavior if this behavior is associated with an ad network that has been previously observed as being acceptable (e.g., as determined from data stored database 114). However, in other cases, actual game code that is itself asking for location may be inappropriate behavior.

The amount of code that is unique to any given application is typically fairly small. Most applications (e.g., for mobile devices) predominantly use code that is in at least one or many other applications (the majority of code in an application is typically not unique and there is a lot of commonality in code between applications).

Sometimes, when a behavior is analyzed in the context of a known SDK, the behavior is a repeatable behavior that has previously been determined to be acceptable (or to have a low risk score). Thus, for example, if a library has already been reviewed, then further analysis can be skipped.

In an embodiment regarding similarity of known and new applications, fuzzy matching and fingerprinting may be used (as was discussed above). For example, a similarity score of zero to one may be used. A similarity score is returned from the server after analysis of a new application. The code in the new application is compared to code that is already in the identified component library (e.g., a library in database 112 on identity server 110).

Typically, there is not an exact code similarity match because there are many changes that a compiler can make to a particular application installation to make it different than other installations. Similarities are defined so that if the differences are over a similarity threshold, then a determination is made that a known component is present in the newly-installed application. For example, the new application may be include a slightly-customized version of a component (that was previously determined to be acceptable). In alternative embodiments other forms of comparison to a threshold may be done (e.g., where a value is lower than the threshold). In other cases, the new application may include a new version of a component that has not been previously analyzed. In one embodiment, unacceptable code that has been only slightly modified to defeat similarity protection mechanisms is instead detected as unacceptable based on behavioral observation and component analysis as discussed above.

In one embodiment, components are analyzed with respect to similarity of previously known components. Behaviors can include use of personal identifying information or device information, or any actions that can be taken by applications on the device, including user interface displays, notifications, network communications, and file reading or writing actions. Policies to control or restrict the behavior of applications and their components may be defined and applied. This can include the identification of advertising networks and defining policies to permit various opt-out actions for these advertising networks.

Assessing Application Authenticity

Various embodiments related to assessing application authenticity are now set forth below. In one embodiment, a method includes: evaluating (e.g., by a server or a user device) authenticity of a first application (e.g., software being downloaded to a mobile device) to provide a result, where the evaluating uses a plurality of inputs. In response to the result, an action is performed on the computing device. For example, the evaluating may be done by a server for an application that a user of a mobile device desires to install from an application marketplace. In one embodiment, the computing device is a server, and the action is sending a notification from the server to the mobile device, the notification including an assessment of authenticity of the first application.

In one embodiment, the computing device is a user device on which the first application is being or has been installed, and the action is providing of a notification in a user interface of the user device relating to an assessment of authenticity of the first application. In an alternative embodiment, the application may have been previously installed on the user device, but the user desires an evaluation of authenticity (e.g., to consider whether to remove the application from the user device).

In one embodiment, one or more of the plurality of inputs may be received from a distributor of the first application, an online application store, a carrier/operator/device manufacturer (e.g., for preloaded software on a mobile device), and/or from a computing device within an enterprise or an organization's internal network.

In one embodiment, the computing device is a server, and the first application has a first package identifier and a first signing identifier, the method further comprising receiving the first package identifier and the first signing identifier from a user device on which the first application is being or has been installed. The first package identifier may be, for example, an Android package name, an Apple iOS bundle identifier, or a hash of such name or identifier, etc. The first signing identifier may be, for example, a certificate (e.g., a signing certificate, digital certificate, etc.), a certificate thumbprint, or a public key, or a hash of a certificate, a hash of a public key, or other data which can be used to identify the signer. In one embodiment, the method further comprises receiving the first application itself from the user device (e.g., for testing or other operation for evaluation by the server).

In one embodiment, the plurality of inputs comprises receipt (e.g., from a computing device of a developer of the first application) of a developer signing certificate for the first application, and the evaluating comprises comparing the developer signing certificate to the first signing identifier.

In one embodiment, the plurality of inputs comprises one or more of the following: receipt, from a computing device, of an indication of ownership in the first application by a developer (e.g., a developer of known or assumed credibility simply makes an assertion or claim to ownership in an electronic communication); a prevalence of the first application (e.g., the application is the most popular version that has been distributed and this version is assumed to be authentic); and a model (e.g., a model to predict expected characteristics associated with a first application and/or to assess observed behavior or characteristics for the first application). In one embodiment, the first application has a first signing identifier, and the plurality of inputs comprises a history of the first signing identifier.

In one embodiment, the method further comprises comparing a first signing identifier of the first application to a signing key in a registry of known signing keys. In one embodiment, the registry comprises a plurality of package identifiers, each identifier associated with a respective one of the known signing keys, and the method further comprises comparing a first package identifier of the first application to the plurality of package identifiers.

In one embodiment, the result from the evaluating is a score, and the performing of the action is conditional on the score exceeding a threshold (or other alternative forms of comparison to the threshold).

In one embodiment, the evaluating comprises: identifying a plurality of applications that are similar to the first application (e.g., using component analysis as discussed above); classifying the similar applications, based on a respective signing identifier for each application; and identifying, based on the classifying, applications having a signing identifier of a developer, and applications having a signing identifier that is different from the signing identifier of the developer.

In one embodiment, the method further comprises sending a notification to a computing device of the developer that identifies the applications having the signing identifier that is different from the signing identifier of the developer.

In one embodiment, the identifying the plurality of applications that are similar to the first application comprises identifying applications having at least one of an identical package identifier, code similarity, identical strings, similar strings, identical media assets, and similar media assets. In one embodiment, a server determines the similarity of newly-observed applications to a previously known-to-be authentic application (e.g., stored in a database at the server). In one example, this determination includes component analysis (e.g., comparison of known and new components) and/or application/component/code similarity assessment as was discussed earlier above. In another example, the server can notify the developer of the authentic application, or challenge the developer to authenticate itself as the actual application signer for the newly-observed application(s).

In one embodiment, the method further comprises receiving the signing identifier of the developer, sending data to the developer to be signed by the developer with a private key, receiving the signed data from the developer, and confirming the signed data corresponds to the signing identifier of the developer. For example, the data sent to the developer may be an archive or a nonce, or the data may be for the issuing of a crypto-based challenge to the developer.

In yet another embodiment, the first application may be examined in the context of known business entity databases (e.g., Equifax database, Dun & Bradstreet database, etc.) or other information sources, and information obtained from such sources may be used as one or more of the plurality of inputs in the evaluating of the first application. For example, these inputs may include: the company name as determined from a WHOIS response; the name of an owner of the IP space that the first application talks to (e.g., an inquiry can be made as to who owns the application server that the first application communicates with); the response to an inquiry as to whether the package name for the first application corresponds to a valid organizational domain name, and further whether that domain name's WHOIS name shows up in a business database; and the developer name as determined in an online application store such as Google Play.

Figure 10:
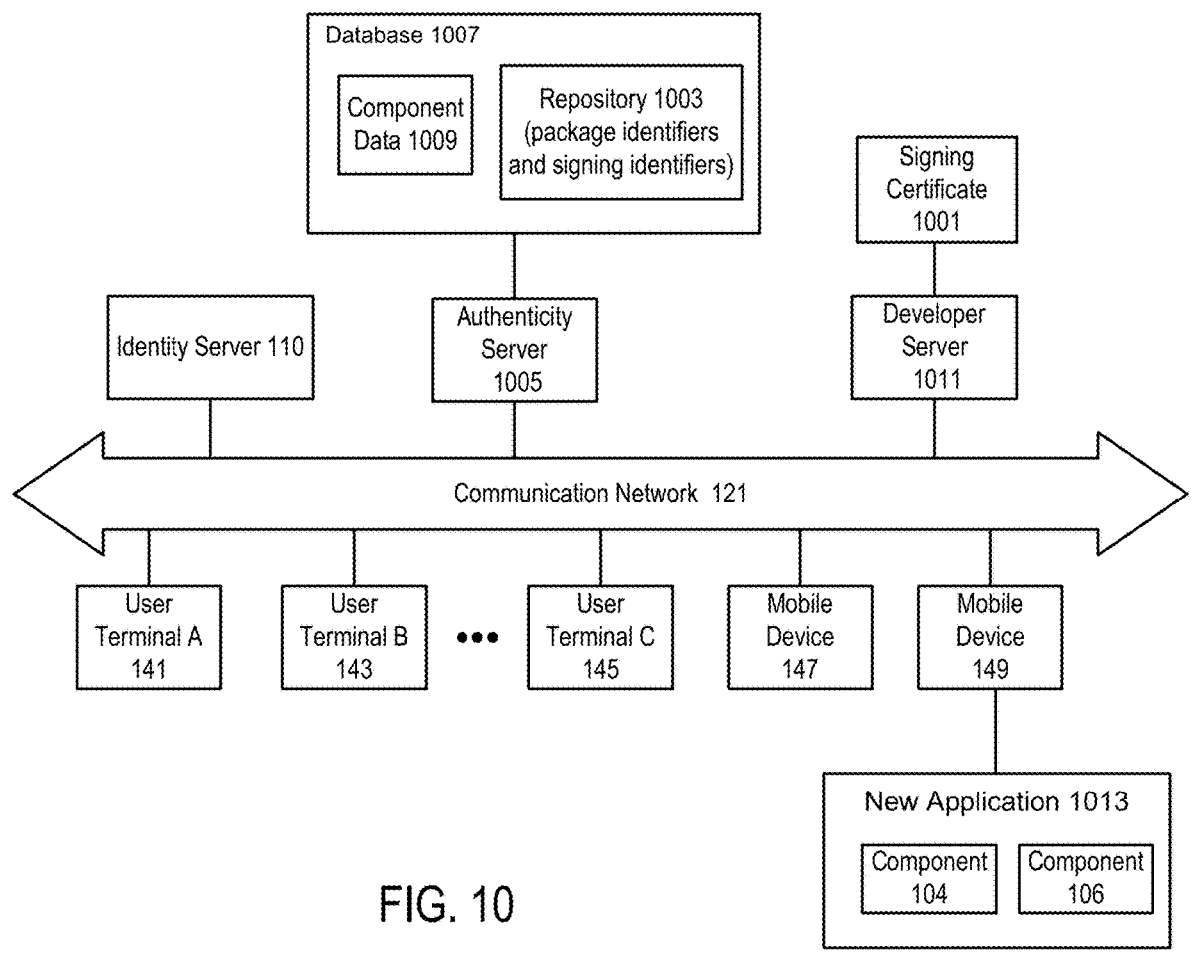
FIG. 10 shows a system for assessing authenticity of an application being newly-installed on a mobile device of a user, in which the mobile device communicates with an authenticity server to evaluate the authenticity of the application, according to one embodiment.

FIG. 10 shows a system for assessing authenticity in which mobile device 149 of a user communicates with authenticity server 1005 to evaluate the authenticity of new application 1013, for example which is being newly-installed on the mobile device (or alternatively has already been installed), according to one embodiment. In other embodiments, some or all of the authenticity functions described for authenticity server 1005 may be performed by identity server 110, which was discussed above with respect to component analysis.

Authenticity server 1005 receives from mobile device 149 a package identifier and a signing identifier associated with new application 1013. Authenticity server 1005 uses a plurality of inputs, such as are described herein, to evaluate the authenticity of new application 1013. This evaluation provides a result, for example a score indicating the risk of the new application being inauthentic. Based on this result, an action is performed by authenticity server 1005.

In one example, this action is the sending of a notification to mobile device 149 in order to alert the user that the new application 1013 may be fraudulent or a tampered version. New application 1013 may have been provided, for example, to application marketplace 123 or directly to mobile device 149, by developer server 1011, along with a signing certificate 1001. Developer server 1011 also provides a package identifier for new application 1013. Signing certificate 1001 is one form of signing identifier that may be provided to authenticity server 1005 for evaluation of new application 1013.

Authenticity server 1005 has a database 1007 for storing information and data regarding applications, such as previously known or identified applications that are considered to be authentic. The authentic developer or other source of the application is stored in database 1007. Database 1007 further may include component data 1009, which corresponds to information about software components as was discussed earlier above. Database 1007 further may include repository 1003, which stores package identifiers and corresponding signing identifiers, for example such as collected or identified for previously authentic, known-good, or deemed good applications.

The evaluation of authenticity may alternatively be performed in part or fully on mobile device 149. If an inauthentic application is discovered, then the user of mobile device 149 may be notified on a display of a user interface. This notification may include an assessment of the authenticity of the new application 1013.

In one embodiment, authenticity server 1005 compares signing certificate 1001 to an existing signing identifier contained in repository 1003. Authenticity server 1005, in one example, compares signing certificate 1001 to a known, good signing key stored in repository 1003.

Various other non-limiting embodiments are now described below. In a first embodiment, authenticity server 1005 has a registry of known application signing keys and the package names they are registered for. If an application pretends to own one of those package names with a different signing key, a user is alerted that the application is likely tampered with. In some cases, authenticity server 1005 may also use similarity detection (e.g., similarity analysis as was discussed earlier above) to determine that, even if an application has a different package name, it is highly similar to another previously-known application, but has a different signer.

In one embodiment, all applications are identified that are similar to a given application (e.g., where the given application is being newly-installed on a mobile device). One or more of the following inputs may be used in evaluating the new application: whether applications have the same package name, code similarity between the applications, similar or identical strings (especially strings that occur infrequently) between new and known applications, and similar or identical media assets (e.g., images, sounds, video, etc.) between new and known applications. In some embodiments, similarity and/or component analysis as was discussed above may be used.

In one embodiment, applications that have been determined to be similar (e.g., as described above) are classified based on signing certificates, which are used to classify applications into two groups: applications with a given developer signing certificate, and applications with a different signing certificate. This classification is used for one or more of the following: identifying potentially pirated applications (e.g., for copyright enforcement); identifying potentially malicious applications; optimizing a sales strategy (e.g., such as identifying additional markets where an application could be sold); and managing release processes (e.g., identifying versions of an application that are sold in different markets).

In one embodiment, a workflow for establishing ownership of a signing certificate includes: a developer or other user uploads the certificate, then receives download of a jar (or Java archive), which the developer must sign to prove that it has the private key corresponding to the certificate. In one embodiment, the workflow is extended to allow a developer to manage multiple signing certificates.

In one embodiment, a workflow for discovering applications, based on proof of certificate ownership includes: a developer or other user proves certificate ownership, then authenticity server 1005 finds all packages signed with the same certificate, and also identifies similar applications, signed both by the same certificate and other certificates. In one embodiment, the workflow is extended to allow a developer to manage multiple signing certificates.

In an alternative embodiment, authenticity server 1005 provides monitoring and security services to Android or other system developers. These services determine developer identification (to confirm that the developer is who it purports to be). The services may include monitoring tools and/or anti-piracy functions. If the developer's application has been pirated and is being distributed in different markets, authenticity server 1005 notifies the developer.

The services may also include brand protection. For example, a bank may want to know if a version of its application has been pirated and is being misused for phishing. In one embodiment, the services include looking at actual software assets being used in applications (e.g., logos, images, etc.) to determine if they are being used in non-sanctioned manners. Application assessments and/or reports for the above services may be provided to a brand owner, developer, or other entity. In another example, a vendor of application components (e.g., such as advertising SDKs, sensor activity SDKs, etc.) may want to know if a version of its components are being used in an application. In one embodiment, the services include looking at application components being used in applications (libraries, SDKs, components, etc.) to determine that they are being used in sanctioned or non-sanctioned manners. Application assessments and/or reports for the above services may be provided to a vendor or developer or distributor of such application components or other entity.

In one embodiment, an assessment of privacy is provided by the services. This includes analyzing potential privacy issues in the application. Authenticity server 1005 may generate a privacy policy for the developer based on permissions provided by the developer. In one embodiment, a security assessment is provided by the services. Authenticity server 1005 analyzes potential security vulnerabilities and provides recommendations to the developer or other entity.

In one embodiment, the services above permit a developer to develop a good reputation. For example, an application/developer certification may be provided to end users after an evaluating of authenticity of an application. For example, a seal of approval or other visual indication may be provided in a user interface display for this purpose to indicate to a user that an application is authentic. The services above may be supported by analysis of application components as described above (e.g., when providing piracy or brand protection).

Additional information regarding various non-limiting examples of analyzing, characterizing, and/or scoring applications with respect to security is described in previously-published U.S. Patent Publication No. 2011/0047594, published Feb. 24, 2011, entitled "System and Method for Mobile Communication Device Application Advisement," by Mahaffey et al., and also in previously-published U.S. Patent Publication No. 2013/0263260, published Oct. 3, 2013, entitled "System and Method for Assessing an Application to be Installed on a Mobile Communication Device", by Mahaffey et al., the entire contents of which applications are incorporated by reference as if fully set forth herein.

In particular, U.S. Patent Publication No. 2013/0263260 describes a system that checks for harmful behavior of an application to be installed on a mobile communication device. A server computer receives from the mobile communication device data pertaining to the application to be installed and information pertaining to the mobile communication device. The server processes the data and information to determine an assessment for the application to be installed. The assessment is provided to the mobile communication device and the assessment is displayed on the device if the assessment is one of dangerous and potentially dangerous. The data and information received from the mobile communication device may be used, for example, as one or more inputs in the plurality of inputs for evaluating the first application as described herein.

Also, in particular, U.S. Patent Publication No. 2011/0047594 describes a system for providing advisement about applications on mobile communication devices such as smartphones, netbooks, and tablets. A server gathers data about mobile applications, analyzes the applications, and produces an assessment that may advise users on a variety of factors, including security, privacy, battery impact, performance impact, and network usage. The disclosure helps users understand the impact of applications to improve the experience in using their mobile device. The disclosure also enables a server to feed information about applications to other protection systems such as application policy systems and network infrastructure. The disclosure also enables advisement about applications to be presented in a variety of forms, such as through a mobile application, as part of a web application, or integrated into other services via an API. The data gathered by the server may be used, for example, as one or more inputs in the plurality of inputs for evaluating the first application as described herein. Also, some of the forms of advisement discussed may be used, for example, in providing notifications to the user and/or to developers or others regarding evaluations of software authenticity.

Additional information regarding various non-limiting examples of some analytic methods for determining application behavior is described in U.S. patent application Ser. No. 14/063,342, filed Oct. 25, 2013, entitled "System and Method for Creating and Assigning a Policy for a Mobile Communications Device Based on Personal Data," by Timothy Micheal Wyatt, the entire contents of which application is incorporated by reference as if fully set forth herein. For example, one or more of the methods for determining behavior may be used when evaluating application authenticity as described herein.

Additional information regarding various non-limiting examples of security evaluation and scoring relating to a plurality of trust factors is described in U.S. patent application Ser. No. 14/072,718, filed Nov. 5, 2013, entitled "Method and System for Evaluating Security for an Interactive Service Operation by a Mobile Device," by Derek Halliday, the entire contents of which application is incorporated by reference as if fully set forth herein. For example, some of the trust factors may be used as inputs when evaluating application authenticity.

In one specific example, the context in which a signing certificate or other signing identifier or signing is observed is assessed using factors which may include one or more trust factors as described in U.S. patent application Ser. No. 14/072,718 above. These factors may, for example, be used in formulating a score that is compared to a threshold that is used to make a decision whether to perform an action in response to evaluating an application (e.g., various forms of comparison to the threshold may be used, as described previously).

In particular, U.S. patent application Ser. No. 14/072,718 describes a method for evaluating security during an interactive service operation by a mobile communications device that includes launching, by a mobile communications device, an interactive service configured to access a server over a network during an interactive service operation, and generating a security evaluation based on a plurality of trust factors related to a current state of the mobile communications device, to a security feature of the application, and/or to a security feature of the network. When the security evaluation is generated, an action is performed based on the security evaluation. In some examples, these actions may be performed in response to the result from an evaluation of application authenticity.

In another embodiment, the first application is evaluated to determine its components and/or to identify behaviors associated with each of the components. This evaluation may provide some or all of the plurality of inputs used in the evaluating of the first application as was discussed above. In one embodiment, the components of the first application can be analyzed regarding similarity to previously-known components when assessing authenticity of the first application.

Behaviors associated with one or more components of the first application may include, for example, use of personal identifying information or device information, or any actions that can be taken by applications on the device, including user interface displays, notifications, network communications, and file reading or writing actions. In one embodiment, the evaluating of the first application may include analysis of components of the first application as described in the section above titled "Analyzing Components of an Application" (and also further optionally include analysis of components in other applications being compared to the first application).

In one embodiment, the first application above is a mobile application, which contains one or more components, such as were discussed previously above. The source of the components is indicated by a component identity. In one example, the component identity is an authorship (e.g., an identification of a developer of the first application), or the name of a component. Previously collected data associated with a given component may be stored in a database (e.g., as was discussed above with respect to database 112).

In one embodiment, as discussed in more detail below, for a first application being installed on mobile device 149, components are identified and behaviors exhibited on mobile device 149 are attributed to one or more of the components. Any given component may be present in several different applications on mobile device 149 and/or may be common to numerous copies or versions of an application that have been installed on mobile or other computing devices for large numbers of other users. In one embodiment, this commonality of component presence permits observing and collecting structural and behavioral data associated with the component. This known component data is stored in a database, and the component data is associated with a particular component identity. Thus, a data repository of prior component data can be used to compare to data more recently obtained for new components (such as those identified in newly-installed applications on a mobile device) when evaluating authenticity of the first application being installed.

More specifically, as characteristics and behaviors associated with components on mobile device 149 are identified and attributed, these characteristics and behaviors may be compared with known characteristics and behaviors stored either locally on mobile device 149 or stored remotely on an authenticity server (and/or identity server 110 as data associated with component identities 114). The results from such comparisons may be used as inputs for the evaluating of the first application being installed (e.g., for making decisions regarding disabling of one or more particular components that are being considered for a new installation on the mobile device).

In one embodiment, behavioral and/or structural characteristics of a component present in the first application may be identified (e.g., as was discussed in the section titled "Analyzing Components of an Application" above). This may be, for example, an application that is being installed on mobile device 149 and for which the user desires to determine if the application is from an authentic source (e.g., a known developer of an earlier or related version of the new application).

A comparison is made between the characteristics attributable to a component associated with the first package identifier and characteristics that have been identified in the new application. In one embodiment, if the identified characteristics are different from the characteristics associated with the first package identifier, then an alert is generated to indicate that the new application is not authentic. The characteristics associated with the first package identifier may be stored in a database of authenticity server 1005 and may be accessed when making this comparison (alternatively, the characteristics may be stored in database 112 and/or the comparison made or supported by identity server 110). For example, these attributable characteristics may be stored as component data associated with respective component identities.

Each component identity has identifying information for a given component that, if present in an application, indicates that the given component is present in the application. Examples of identifying information include the following: a package name prefix for a set of one or more classes, a class name, or a code fingerprint of a code block, method, class, package, etc.

Analysis of a new application being installed can be used to determine if identifying information for a given component identity matches the new application. If it matches, then the given component is present in the new application. This analysis can be done at the client (e.g., mobile device 149), the server (e.g., authenticity server 1005 or identity server 110), or using a combination thereof. This match that determines presence of the component in the new application can be used as an input in evaluating authenticity of the new application.

In a different embodiment, the client computing device submits an identifier for the new application to the server. This identifier may be, for example, a hash of the application binary code, a package name, a title of the application, or another form of application identifier. The server stores data regarding previously-analyzed applications. This data includes a list of components for each of the previously-analyzed applications.

The server uses the identifier received from the client and compares this identifier to the data regarding previously-analyzed applications. If there is a match between the identifier and a previously-analyzed application, then the components for that matched application (obtained from the stored list of components above) are determined to be in the new application. This result may be sent to the client device. Also, this result may be used as one of the plurality of inputs in evaluating the application. In one example, this matching to the database is done similarly as was described earlier above for the component analysis on a single device. The server sends information about these identified component identities back to the client (e.g., a notification that a new application is not authentic, or a score indicating the risk of a fraudulent application).

If the actual behavior and the known behavior for the component identity are different, this may indicate that the component in the new application is either a newer version or a tampered-version (i.e., is not authentic), and that the component needs to be reviewed again in order to update the database. Also, an alert may be generated based on the component information determined above. For example, an email may be sent to an analyst to do further analysis of a component, or an entry may be created in a work queue regarding further component analysis to be done. In another example, a notification is sent to the developer of a prior, known-good version of an application (e.g., to alert the developer that a fraudulent version of the application was identified).

Yet further additional non-limiting embodiments and examples are now discussed below. In a first embodiment, a developer registers through a website and provides its signing key. The developer claims ownership of a given application. An application that is signed with this key is considered to be owned by the developer. If the same application is signed by a different person or entity, then authenticity server 1005 alerts the developer that another entity is potentially illegitimate.

In one embodiment, authenticity server 1005 implements an authenticity component and a response component. An application is evaluated by the authenticity component and the result from the authenticity component is acted upon by the response component.

The authenticity component is a data set that may include a plurality of inputs used for evaluating an application. For example, these inputs may include that a developer signs an application, the prevalence of an application, the context or environment in which the application is observed, and a history of the signing key or certificate associated with an application. The output from this evaluation may be a score such as, for example, 0.4 or 0.6 on a scale of 0.0-1.0. This multi-input authenticity component model provides a result that is acted upon by the response component.

Another embodiment is based on probability, in which it is assumed that the most popular version of a given application is the legitimate one. Another embodiment assumes that the application that is published in Google Play, or another legitimate application store, is the legitimate or authentic one.

If another version of that same application is signed by a different person, then one of the applications is authoritative and the other is not. Authenticity server 1005 alerts the user the mobile device as to whether a version being installed is authentic.

In one embodiment, there are various ways to determine the authentic version of several versions of an application being distributed. In some cases the most popular version of an application may not be the authentic version of the application. Thus, a collection of factors are used from the exemplary inputs provided above (e.g., whether the application is published in the Google Play store, what is the context of the observation of the application, does the application have good online reviews over an extended predetermined time period, such as for example more than 6 months, etc.).

In one embodiment, the history of usage of a signature is considered as an input. For example, if a signing key is used to sign an application that authenticity server 1005 knows is bad, then if that same key signs other applications, those applications can also be assumed to be bad. This is like a signer reputation. If the signer is connected to prior suspicious activity, then the signer itself can be flagged as suspicious, and this fact considered in evaluating authenticity.

Another input may be the signing of different applications that authenticity server 1005 knows are provided from different developers. Another input is that the applications may communicate with different servers in different parts of the world—this indicates that one of the applications is not authentic and/or that there are potentially different developers.

In one embodiment, the first appearance of a signed application indicates authenticity. For example, the first person to sign and package that application is considered or assumed to own it. Authenticity server 1005 may have a huge network of devices (e.g., greater than 10,000 or 1 million devices) that report all the applications that they see. Therefore, presumably the legitimate application appears first as stored in database 1007. For example, the first time that the server sees an application, it will take the signature on that application and consider it to be the authentic signature.

In one embodiment, another input is the number of stars or other rating level that an application gets in Google Play or another store. For example the application may have been in a store for at least a predetermined time period (e.g., at least one or two years) and have a good rating. If the application has at least a predetermined number of ratings, for example, 300,000 ratings, and a star value over a given level, then the application is likely a legitimate version of the application.

In one embodiment, the longevity of the key is an input. The longevity may be a weighted user distribution based on time period and number of users. For example, if the application is observed for a year, but with very little users, that is a negative input. However, in contrast, having a million users over a year is a positive sign.

In one embodiment, various inputs are provided into a black box model used in authenticity evaluation. The inputs may include, for example, the signing key as registered by the developer itself, the usage history of a signing key, a history-weighted time of first appearance, an appearance in certain reputable application stores, a signing key used to sign applications that are substantially different, applications that talk to substantially different servers, applications that have substantially different code bases, and two applications that are signed and appear under different developer names in an authoritative marketplace such as Google Play.

In one embodiment, there are different interfaces provided for different users to provide information from authenticity server 1005 about the result from the evaluation of the authenticity. For the end-user, there may just be a warning provided (e.g., a popup that states that an application is not authentic). An alternative is a notice that indicates (e.g., a seal that appears in the lower right-hand corner of a window) to the user that this is an authentic application. As one example, a user is presented and sees an authentication seal when a banking application is being installed by the user on its mobile device.

Closing

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a data repository storing known behaviors associated with known software components;
at least one processor; and
memory storing instructions configured to instruct the at least one processor to:
monitor a first application to be installed on a first user device;
determine a usage history of a signing identifier used to sign the first application, the usage history comprising signing of a third application by the signing identifier, wherein the third application is installed on a second user device, and wherein the signing identifier is a certificate, a certificate thumbprint, a public key, a hash of a certificate, or a hash of a public key;
determine a plurality of software components of the first application, the plurality of software components including a first component having an associated behavior representing actions the first application is configured to perform on the first user device;
compare the associated behavior of the first component to a known behavior stored in the data repository, wherein the known behavior is observed on user devices other than the first user device, the known behavior is associated with execution of a second application identified as being similar to the first application, and the first application and the second application are different; and
in response to the comparison between the associated behavior of the first component to the known behavior stored in the data repository, generate a recommendation to configure or disable the first component of the first application.

2. The system of claim 1, wherein the instructions are further configured to instruct the at least one processor to assess security of a network used by an interactive service launched by the first user device to access a server.

3. The system of claim 1, wherein the instructions are further configured to instruct the at least one processor to assess a context of the first user device when the signing identifier used to sign the first application is observed.

4. The system of claim 1, wherein the instructions are further configured to instruct the at least one processor to assess a context of the first user device based on trust factors, wherein the trust factors comprise at least one of:
  a factor directed to whether the first user device is protected by an anti-malware software application;
  a factor directed to identifying an application being accessed by a web browser running on the first user device, and determining whether the application being accessed by the web browser is a security threat; or
  a factor related to a security feature of the first application.

5. The system of claim 1, wherein the instructions are further configured to instruct the at least one processor to compare, by accessing the data repository, at least one behavior of the first application and a stored known behavior of the third application.

6. A method comprising:
  monitoring a first application to be installed on a first user device;
  determining a usage history of a signing identifier used to sign the first application, the usage history comprising signing of a third application by the signing identifier, wherein the third application is installed on a second user device, and wherein the signing identifier is a certificate, a certificate thumbprint, a public key, a hash of a certificate, or a hash of a public key;
  determining a plurality of software components of the first application, the plurality of software components including a first component having an associated behavior representing actions the first application is configured to perform on the first user device;
  comparing the associated behavior of the first component to a known behavior stored in a data repository, wherein the known behavior is observed on user devices other than the first user device, the known behavior is associated with execution of a second application identified as being similar to the first application, and the first application and the second application are different; and
  in response to the comparison between the associated behavior of the first component to the known behavior stored in the data repository, generating a recommendation to configure or disable the first component of the first application.

7. The method of claim 6, further comprising causing an identification of the first component in a user interface of the first user device, wherein the user interface is configured to receive, from a user, a selection of a behavior based on the identification of the first component.

8. The method of claim 6, further comprising causing the first component to execute in conformance with a result from a query of an identity server.

9. The method of claim 8, further comprising confirming compliance of the first application with a user policy stored on the identity server.

10. The method of claim 6, further comprising disabling, based on the comparison between the associated behavior of the first component to the known behavior in the data repository, execution of one or more components of the first application.

11. The method of claim 6, further comprising determining at least one of whether an application being accessed by a web browser running on the first user device is a security threat, or whether the first user device is protected by an anti-malware software application.

12. A non-transitory computer-readable storage medium storing computer-readable instructions, which when executed, cause a computing apparatus to:
  monitor a first application to be installed on a first user device;
  determine a usage history of a signing identifier used to sign the first application, the usage history comprising signing of a third application by the signing identifier, wherein the third application is installed on a second user device, and wherein the signing identifier is a certificate, a certificate thumbprint, a public key, a hash of a certificate, or a hash of a public key;
  determine a plurality of software components of the first application, the plurality of software components including a first component having an associated behavior representing actions the first application is configured to perform on the first user device;
  compare the associated behavior of the first component to a known behavior stored in a data repository, wherein the known behavior is observed on user devices other than the first user device, the known behavior is associated with execution of a second application identified as being similar to the first application, and the first application and the second application are different; and
  in response to the comparison between the associated behavior of the first component to the known behavior stored in the data repository, generate a recommendation to configure or disable the first component of the first application.

13. The non-transitory computer-readable storage medium of claim 12, wherein the instructions further cause the computing apparatus to receive, from the first user device, a user selection of at least one behavioral preference.

14. The non-transitory computer-readable storage medium of claim 12, wherein the instructions further cause the computing apparatus to, based on the comparison between the associated behavior of the first component to the known behavior stored in the data repository, disable execution of at least one component of the first application.

15. The non-transitory computer-readable storage medium of claim 12, wherein a context of the first user device is assessed when the signing identifier used to sign the first application is observed.

16. The non-transitory computer-readable storage medium of claim 12, wherein the instructions further cause the computing apparatus to cause an identification of the first component in a user interface of the first user device, wherein the user interface is configured to receive selection of a behavior based on the identification of the first component.

17. The non-transitory computer-readable storage medium of claim 12, wherein the instructions further cause the computing apparatus to cause the first component to execute in conformance with a result from a query of an identity server.

* * * * *